US009517433B2

(12) United States Patent
Huizing et al.

(10) Patent No.: US 9,517,433 B2
(45) Date of Patent: *Dec. 13, 2016

(54) SELECTIVE WATER VAPOUR TRANSPORT MEMBRANES COMPRISING A NANOFIBROUS LAYER AND METHODS FOR MAKING THE SAME

(71) Applicant: DPOINT TECHNOLOGIES INC., Vancouver (CA)

(72) Inventors: Ryan Nicholas Huizing, Vancouver (CA); Frank K. Ko, Vancouver (CA)

(73) Assignee: DPOINT TECHNOLOGIES INC., Vancouver, BC ( * ) Notice: Subject to any disclaimer, the term of this patent is extended or adjusted under 35 U.S.C. 154(b) by 91 days.

This patent is subject to a terminal disclaimer.

(21) Appl. No.: 14/535,160

(22) Filed: Nov. 6, 2014

(65) Prior Publication Data

US 2015/0059578 A1    Mar. 5, 2015

Related U.S. Application Data

(63) Continuation of application No. 14/008,138, filed as application No. PCT/CA2012/000560 on Jun. 7, 2012, now Pat. No. 8,936,668.

(Continued)

(51) Int. Cl.
*B01D 69/10*    (2006.01)
*F24F 12/00*    (2006.01)
(Continued)

(52) U.S. Cl.
CPC ............. *B01D 53/22* (2013.01); *B01D 53/228* (2013.01); *B01D 53/268* (2013.01); *B01D 69/10* (2013.01);
(Continued)

(58) Field of Classification Search
CPC ..... B01D 53/22; B01D 53/228; B01D 53/268; B01D 69/10; B01D 71/32; B01D 71/36; B01D 71/42; B01D 71/52; B01D 71/54; B01D 71/82; B01D 2053/221; B01D 2057/80; B01D 2259/4508; B01D 2323/30; B01D 2323/39; B01D 2325/48; B29D 99/005; B32B 15/02; B32B 15/20; B32B 1/00; B32B 2260/023; B32B 2260/046; B32B 2262/0276; B32B 2307/7242; B32B 3/28; B32B 5/022; B32B 5/26; D01D 5/0076; D01F 6/18; F24F 12/001; F24F 12/006; Y02B 30/563; Y02P 70/621; Y02P 70/623
(Continued)

(56) References Cited

U.S. PATENT DOCUMENTS 6,145,588 A    11/2000    Martin et al.
6,413,298 B1    7/2002    Wnek et al.
(Continued)

FOREIGN PATENT DOCUMENTS

WO    0127368 A1    4/2001
WO    2005075048 A1    8/2005
(Continued)

OTHER PUBLICATIONS

Fan, et al, "Performance improvement of polysulfone ultrafiltration membrane by blending with polyaniline nanofibres", Journal of Membrane Science 320 (2008), 363-371.
(Continued)

*Primary Examiner* — Frank Lawrence
(74) *Attorney, Agent, or Firm* — Oyen Wiggs Green & Mutala LLP

(57) ABSTRACT

A water vapor transport membrane comprises a nanofibrous layer disposed on a macroporous support layer, the nanofi-
(Continued)

brous layer coated with a water permeable polymer. A method for making a water vapor transport membrane comprises forming a nanofibrous layer on a macroporous support layer and applying a water permeable polymer to the nanofibrous layer. The water permeable polymer can be applied for so that the nanofibrous layer is substantially or partially filled with the water permeable polymer, or so that the coating forms a substantially continuous layer on one surface of the nanofibrous layer. In some embodiments of the method, the nanofibrous layer is formed by electrospinning at least one polymer on at least one side of the porous support layer. In some embodiments, the support layer is formable and the method further comprises forming a three-dimensional structure from the water vapor transport membrane, for example, by compression molding, pleating or corrugating.

30 Claims, 11 Drawing Sheets

Related U.S. Application Data

(60) Provisional application No. 61/494,122, filed on Jun. 7, 2011.

(51) Int. Cl.
| | | |
|---|---|---|
| B01D 53/22 | (2006.01) | |
| B01D 71/32 | (2006.01) | |
| B01D 71/36 | (2006.01) | |
| B01D 71/42 | (2006.01) | |
| B01D 71/52 | (2006.01) | |
| B01D 71/54 | (2006.01) | |
| B01D 71/82 | (2006.01) | |
| D01D 5/00 | (2006.01) | |
| D01F 6/18 | (2006.01) | |
| B29D 99/00 | (2010.01) | |
| B01D 53/26 | (2006.01) | |
| B32B 5/02 | (2006.01) | |
| B32B 5/26 | (2006.01) | |
| B32B 15/02 | (2006.01) | |
| B32B 15/20 | (2006.01) | |
| B32B 1/00 | (2006.01) | |
| B32B 3/28 | (2006.01) | |

(52) U.S. Cl.
CPC .............. *B01D 71/32* (2013.01); *B01D 71/36* (2013.01); *B01D 71/42* (2013.01); *B01D 71/52* (2013.01); *B01D 71/54* (2013.01); *B01D 71/82* (2013.01); *B29D 99/005* (2013.01); *B32B 1/00* (2013.01); *B32B 3/28* (2013.01); *B32B 5/022* (2013.01); *B32B 5/26* (2013.01); *B32B 15/02* (2013.01); *B32B 15/20* (2013.01); *D01D 5/0076* (2013.01); *D01F 6/18* (2013.01); *F24F 12/001* (2013.01); *F24F 12/006* (2013.01); *B01D 2053/221* (2013.01); *B01D 2257/80* (2013.01); *B01D 2259/4508* (2013.01); *B01D 2323/30* (2013.01); *B01D 2323/39* (2013.01); *B01D 2325/48* (2013.01); *B32B 2260/023* (2013.01); *B32B 2260/046* (2013.01); *B32B 2262/0276* (2013.01); *B32B 2307/7242* (2013.01); *Y02B 30/563* (2013.01); *Y02P 70/621* (2015.11); *Y02P 70/623* (2015.11)

(58) Field of Classification Search
USPC ........... 96/11, 12; 95/52; 62/91, 93, 94, 480, 62/271; 165/133, 10, 166
See application file for complete search history.

(56) References Cited

U.S. PATENT DOCUMENTS

| | | |
|---|---|---|
| 6,536,514 B1 | 3/2003 | Sugiyama et al. |
| 6,680,016 B2 | 1/2004 | Wang et al. |
| 6,951,242 B1 | 10/2005 | Des Champs et al. |
| 7,188,665 B2 | 3/2007 | Arai et al. |
| 8,686,054 B2 | 4/2014 | Elabd et al. |
| 2002/0096246 A1 | 7/2002 | Sennet et al. |
| 2003/0232187 A1 | 12/2003 | Kauffman et al. |
| 2005/0013933 A1 | 1/2005 | Chen et al. |
| 2006/0068668 A1 | 3/2006 | Kameoka et al. |
| 2007/0190880 A1 | 8/2007 | Dubrow et al. |
| 2008/0149561 A1 | 6/2008 | Chu et al. |
| 2009/0078640 A1 | 3/2009 | Chu et al. |
| 2009/0324925 A1 | 12/2009 | Conley et al. |
| 2010/0031817 A1 | 2/2010 | Ehrenberg et al. |
| 2010/0224555 A1 | 9/2010 | Hoek et al. |
| 2010/0304108 A1* | 12/2010 | Doshi .................. D01D 5/0038 428/219 |
| 2010/0323573 A1 | 12/2010 | Chu et al. |
| 2011/0003134 A1 | 1/2011 | Lambertz |
| 2011/0111279 A1* | 5/2011 | Smithyman ............. B29C 41/16 429/122 |
| 2012/0077015 A1 | 3/2012 | Zhou et al. |
| 2012/0144790 A1* | 6/2012 | Cambo .................. B01D 46/10 55/486 |

FOREIGN PATENT DOCUMENTS

| | | |
|---|---|---|
| WO | 2007001405 A2 | 1/2007 |
| WO | 2008118955 A1 | 10/2008 |
| WO | 2009103556 A1 | 8/2009 |
| WO | 2010132983 A1 | 11/2010 |
| WO | 2011142726 A1 | 11/2011 |
| WO | 2012094407 A1 | 7/2012 |

OTHER PUBLICATIONS

Kang, et al., "Application of Electrospun Polyurethane Web to Breathable Water-proof Fabrics", Fibers and Polymers 2007, vol. 8, No. 5, 564-570.
Wang, et al., "High Flux Filtration Medium Based on Nanofibrous Substrate with Hydrophilic Nanocomposite Coating", Environ. Sci. Technol. 2005, 39 7684-7691.
Graham, et al., "Polymeric Nanofibers in Air Filter Applications", presented at Fifteenth Annual Technical Conference & Expo of the American Filtration & Separations Society, Galveston, Texas, Apr. 9-12, 2002.
Gibson, et al., "Transport properties of porous membranes based on electrospun nanofibres", Colloids and Surfaces A: Physicochemical and Engineering Aspects 187-188, (2001), 469-418.

* cited by examiner

SELECTIVE WATER VAPOUR TRANSPORT MEMBRANES COMPRISING A NANOFIBROUS LAYER AND METHODS FOR MAKING THE SAME

CROSS-REFERENCE TO RELATED APPLICATIONS

This application is a continuation of U.S. patent application Ser. No. 14/008,138, entitled "Selective Water Vapour Transport Membranes Comprising a Nanofibrous Layer and Methods for Making the Same", filed on Sep. 27, 2013 and now issued as U.S. Pat. No. 8,936,668, which is a 371 of PCT International Patent Application No. PCT/CA2012/000560, entitled "Selective Water Vapour Transport Membranes Comprising a Nanofibrous Layer and Methods for Making the Same", filed on Jun. 7, 2012, which claims priority benefits from U.S. Provisional Patent Application Ser. No. 61/494,122, entitled "Selective Water Vapour Transport Membranes Comprising a Nanofibrous Layer and Methods for Making the Same", filed on Jun. 7, 2011, all of which are hereby incorporated by reference their entirety.

FIELD OF THE INVENTION

The present invention relates to water vapour transport membranes comprising a nanofibrous layer and selective coating. Such membranes are particularly suitable for use in enthalpy exchangers and other applications involving exchange of moisture and optionally heat between gas streams, with little or no mixing of the gas streams through the membrane.

BACKGROUND

A heat recovery ventilator (HRV) is a mechanical device that incorporates a heat exchanger with a ventilation system for providing controlled ventilation into a building. The heat exchanger heats or cools the incoming fresh air using the exhaust air. Devices that also exchange moisture between the two air streams are generally referred to as Energy Recovery Ventilators (ERV), sometimes also referred to as Enthalpy Recovery Ventilators or enthalpy exchangers.

In order for buildings to have good indoor air quality they require an exchange of the stale indoor air with fresh outdoor air. An ERV can be used for this purpose, and incorporates a method to remove excess humidity from, or add humidity to, the ventilating air that is being brought into a building. In addition to improving indoor air quality in buildings, installation of an ERV will result in energy savings. For example, in hot and humid climates, useable energy is wasted when the cooled air from the building is exhausted. In an ERV the exhaust air can be used to cool the warmer air being brought in from the outside, reducing the energy consumption load on the air conditioner and the energy associated with air conditioning. With proper design, the size of the air conditioner can be reduced. If buildings tend to be too humid, ERVs can lower humidity levels, reducing the likelihood of mould, bacteria, viruses, and fungi which cause sickness, absenteeism and lost productivity. On the other hand, in cold dry climates, energy is wasted when warm air from the building is exhausted, plus there can be an additional issue of the incoming air stream being too dry. As well as transferring heat from the exhaust air to the incoming air, ERVs can be used to recycle water vapour from the exhaust stream, raising humidity levels, thereby reducing skin irritation, dryness, and respiratory symptoms caused by dry air.

A key component in the ERV system which transfers the heat and humidity between the air streams is called the ERV core. The two most common types of ERV are those based on planar membrane plate-type devices and those based on rotating enthalpy wheel devices. Planar plate-type ERV cores comprise layers of water permeable membrane. The two air streams are directed through alternate layers, or on opposite sides, of the ERV core, and heat and humidity is transferred via the membrane. Enthalpy wheel ERVs (also known as energy wheels) typically have a cylindrical or disc-shaped honeycomb core that is coated with desiccant. A motor rotates the cylinder, transferring the heat and humidity between the intake and exhaust air streams. ERV systems typically also comprise an enclosure, pumps or fans to move the air streams, ducting, as well as filters, control electronics and other components.

Since the air is being exhausted primarily to remove stale and contaminated air from the building, preferably the exhaust stream should not be able to mix with the incoming stream on the opposite side of the membrane as the two streams pass through the ERV. However, in many cases there is crossover contamination (leakage between streams) due to leakage at seals or joints in the ERV and/or due to passage of the gases through the membrane material.

Preferably the membrane used in an ERV core is thin to allow adequate exchange of heat between the two streams, driven by the temperature gradient between the streams. The membrane is also water permeable to allow moisture to pass through the material, driven by the vapour pressure differential or water concentration gradient between the two streams. Thinner membranes will tend to have higher heat and moisture transport rates. Ideally the membrane is also impermeable to air, and contaminant gases, to prevent the mixing and crossover of the two streams through the membrane.

Membranes that have been used or suggested for ERV applications include cellulose films; cellulose fibre or glass fibre papers or porous polymer films that are coated or impregnated with a hydrophilic polymer or a hydrophilic polymer-desiccant mixture; thin film composites manufactured via interfacial polymerization; laminated membranes made from a blown film on a non-woven support layer; laminated membranes comprising an ionomer film bonded to a porous support; and sulphonated and carboxylated ionomer films. Other materials involve applying a water permeable coating to the microporous substrate. All of these materials have shortcomings however. For example, cellulose films are not mechanically and dimensionally stable in wet conditions, tend to be subject to freeze/thaw cracking, and are typically fairly thick (for example, greater than 10 micron) which leads to lower water permeance. In the presence of liquid water, water-soluble components tend to wash off papers or polymer films that are coated with hydrophilic polymers and/or polymer-desiccant mixtures. When a desiccant is added to the coating, this can necessitate high loadings of desiccant (>80%) and thick coating layers in order to block gas transport; this can reduce water transport. Cellulose films and coated papers also tend to be flammable and subject to microbial growth. In the case of thin film composites manufactured via interfacial polymerization, monomers are reacted on the surface of a porous polymeric substrate to make a chemically-bound water permeable coating, in order to reduce the problem of the coating washing off. Such membranes tend to be costly and their fabrication involves the use of organic solvents and other harsh chemicals. Also, the types of additives that can be incorporated are limited by the chemistry involved.

Laminated membranes made by bonding a cast ionomer film to a porous support, or a blown film (for example, polyether-block amide (PEBA)) laminated to a nonwoven tend to delaminate because of the different dimensional properties (for example, swelling and thermal expansion) of the two layers and the difficulty in creating a strong bond between them. Also, the water transport performance of such laminated membranes tends to be limited because the ionomer or blown film has to be sufficiently thick (for example, greater 5 microns) so that it can be processed into a continuous, pinhole-free film and then handled in order to manufacture the laminate.

Desirable properties of a membrane for enthalpy exchangers, and other applications involving exchange of moisture and optionally heat between gas streams with little or no mixing of the gas streams through the membrane, generally include the following:

High water permeation (vapour and liquid);
High water absorption;
Low or zero air and contaminant gas permeation;
Non-flammable;
Resistance to microbial growth;
Favorable mechanical strength and properties when dry or when wet, so that the membrane is easy to handle, does not tear easily, preferably will accept and hold a pleat, and is stiff enough to withstand pressure differentials so the membrane does not deflect unduly;
Good dimensional stability in the presence of liquid water and washable, allowing cleaning for maintenance purposes without damaging or compromising the functionality of the ERV core;
Long lifetime under the required operating conditions, without detrimental leaching or loss of membrane components and without significant degradation in water vapour transport performance or increased contaminant crossover;
Tolerance to freeze-thaw cycles in the presence of liquid water condensation without significant deterioration in performance;
Low cost;
Formability, meaning the membrane can be formed into three-dimensional structures and will hold its formed shape.

Often the above represent conflicting requirements. For example, materials which have low air permeability tend to also have low water permeability; polymer films provide excellent handling, but tend to be rather flammable; and specialty polymers and highly engineered thin film composites and similar materials tend to be very expensive.

Some of the most promising state-of-the-art membranes for these devices are porous desiccant-loaded polymer substrates coated with a thin layer of water permeable polymer, for example, as described in WO2010/132983 which is hereby incorporated by reference. The substrate provides structural rigidity to the membrane while the thin functional polymer layer provides water vapour transport selectivity. Utilizing such substrates allows the application of a thin water permeable polymer layer (for example, the thickness of the coating can be less than 5 microns, and is preferably less than 1 micron) which improves the water vapour permeation performance of these materials, although there is still some resistance to water transport through the coating layer. The thickness of the substrate is typically in the range of 50-200 microns, and testing indicates that more than 50% of water vapour transport resistance in such membranes comes from the substrate. This is related to the nature of the porous substrate, which tends to have tortuous pores and dead-ended pores, leading to increased resistance to water transport.

One of the key ways to increase enthalpy exchange efficiency in ERVs and other devices is by decreasing the water vapour transport resistance of the substrate material. At the same time it is important not to increase the thickness of the selective layer. A further way to increase performance is to improve the water permeance of the selective polymer layer. However, many higher permeability polymers are cost prohibitive for these applications. The substrate layer represents a large portion of the cost and transport resistance in current materials. If this layer can be eliminated, the membrane cost will be drastically decreased while the vapour transport performance will be increased. For example in one current generation membrane material for ERV applications, the cost of the microporous substrate layer is over 80% of the membrane cost. If the microporous substrate can be eliminated from the membrane, there may be an economic justification for using more costly, but higher permeability coating materials and additives.

Membranes which are formable are advantageous in the assembly and fabrication of membrane modules. Engineered composite membrane materials which can be formed into self-supporting three-dimensional structures, will allow increased performance and decreased cost in membrane-based devices.

The water vapour transport membranes described herein can provide high water permeance and high selectivity (low gas crossover) making them particularly suitable for ERV applications, and other applications involving exchange of moisture and optionally heat between gas streams. Furthermore, membranes which have similar permeation and selective properties which can also be formed into three-dimensional structures are demonstrated.

SUMMARY OF THE INVENTION

A water vapour transport membrane comprises a nanofibrous layer disposed on a porous support layer, wherein the nanofibrous layer is coated with a water permeable polymer. The nanofibrous layer can be substantially or partially filled with the water permeable polymer, or the coating can form a substantially continuous layer on one surface of the nanofibrous layer.

A method for making a water vapour transport membrane comprises:

(a) forming a nanofibrous layer on a porous support layer; and (b) applying a water permeable polymer to the nanofibrous layer.

The water permeable polymer can be applied so that the nanofibrous layer is substantially or partially filled with the water permeable polymer, or so that the coating forms a substantially continuous layer on one surface of the nanofibrous layer. In some embodiments of the method, the nanofibrous layer is formed by electro-spinning at least one polymer on at least one side of the porous support layer. In some embodiments of the method, the support layer is formable, and the method can further comprise forming a three-dimensional structure from the membrane, for example, by compression molding, pleating or corrugating.

In some embodiments of the above described water vapour transport membranes, or methods for making water vapour transport membranes, the water permeable polymer can be cross-linked. In some embodiments the water permeable polymer is non-ionic, in some embodiments it is ionomeric. In some embodiments the water permeable polymer comprises a cross-linked, polyurethane-polyether polymer or a perfluoronated sulphonic acid polymer.

In some embodiments of the above described water vapour transport membranes, or methods for making water vapour transport membranes, the nanofibrous layer can comprise polyacrylonitrile fibres.

In some embodiments of the above described water vapour transport membranes, or methods for making water vapour transport membranes, the water permeable polymer binds the nanofibrous layer to the porous support layer.

In preferred embodiments of the above described water vapour transport membranes, or methods for making water vapour transport membranes, the support layer is macroporous. In preferred embodiments of the above described water vapour transport membranes, or methods for making water vapour transport membranes, the support layer is formable.

In preferred embodiments of the above described water vapour transport membranes, or methods for making water vapour transport membranes, the water vapour transport membrane is substantially air-impermeable.

In some embodiments of the above described water vapour transport membranes, or methods for making water vapour transport membranes, the support layer is omitted.

Water vapour transport membranes as described herein are particularly useful in enthalpy exchange devices and water vapour transport applications. For example, they can be used in energy recovery ventilators. Thus, also provided is an energy recovery ventilator core comprising a water vapour transport membrane comprising a nanofibrous layer, wherein the nanofibrous layer is coated with a water permeable polymer. Preferably the nanofibrous layer is disposed on a porous support layer.

The present water vapour transport membranes are advantageous over known water vapour transport membranes in that, by utilizing a nanofibrous layer to support a functional coating, a low cost, highly water vapour permeable and selective membrane can be created for gas-to-gas moisture and/or heat transfer applications. In combined heat and moisture transport applications, a thin membrane will be beneficial. These layers can also be created on a number of support structures, which may be formable, allowing for improved exchanger geometries and higher performance.

DETAILED DESCRIPTION OF EMBODIMENTS OF THE INVENTION

Figure 1A:
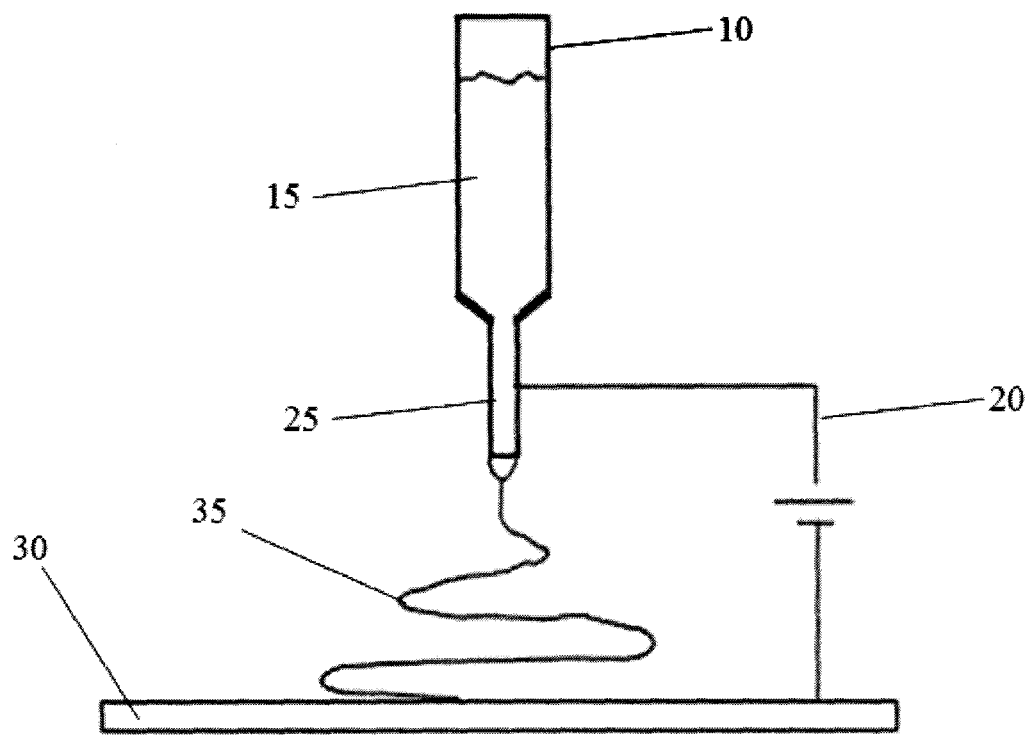
FIG. 1A is a simplified diagram illustrating an example of a nanofibre spinning apparatus and process that can be used to prepare a nanofibrous layer.

In the present approach, improved water vapour transport membranes comprise a nanofibrous layer which is coated with a water vapour permeable polymer.

As used herein "coated" generally means that fibres of the nanofibrous layer have the water vapour permeable polymer deposited on them. "Coated" includes situations where the nanofibrous layer is filled (fully impregnated), or partially filled, with the water vapour permeable polymer, and/or where there is a layer or film of the water vapour permeable polymer on one or both surfaces of the nanofibrous layer. The water vapour permeable polymer is also referred to herein as a "functional coating" or "functional polymer".

The functional coating allows the membrane to be substantially impermeable to gases and contaminants, while remaining highly permeable to water and water vapour. This property is referred to as selectivity. The membranes described herein are selective for water vapour over other gases and contaminants. In some embodiments the nanofibrous layer is supported on a macroporous support layer, for example, to increase the ease of handling and processing the membrane. In some embodiments the functional coating, in addition to imparting selectivity and high water vapour permeance, may also act as a binder to adhere the nanofibrous layer to the support layer. The support layer may also be formable, for example, so that the membrane can be corrugated, pleated or formed into a series of channels or other three-dimensional structures. The membrane may further contain additives to impart desirable functionality to the membrane, such as flame retardancy, anti-microbial activity, or improved absorption of water and water vapour.

In the present approach, the nanofibrous layer acts as a framework to support the functional coating. Water vapour transport resistance in the substrate can be substantially reduced as fibre diameters approach a nanometer scale of 10-1000 nm. In the present description, nanofibrous materials are defined as materials with fibre diameters less than about 1000 nm. Due to the small diameter of the fibres, the nanofibrous layer has very high porosity. The effective pore size of the nanofibrous layer is generally a function of extent of deposition of nanofibrous material during fabrication of the nanofibrous layer. The nanofibrous layer has high water vapour permeance, since it has high porosity and nearly all the pores are through-pores, with few dead-ends and low tortuosity. This means that water vapour will diffuse through the nanofibrous layer via open air space between the fibres, with a relatively unobstructed straight path through the thickness of the layer and little interaction with the fibres. Thus, the path length of a diffusing molecule of water vapour travelling in the axis perpendicular to the plane of the nanofibrous layer is in a range of the thickness of the layer. This leads to lowered resistance to the transport of diffusing species, as molecules will have a direct and non-impeded pathway through the nanofibrous layer, and thus a higher water vapour permeance. The nanofibrous layer may inherently, or through incorporation of additives, impart desirable properties to the membrane. These properties may include, but are not limited to, increased sorption, microbial resistance, or flame resistance. A further advantage of using a nanofibrous layer for membrane fabrication is that the layer contains very little of polymer by weight, and thus the material cost will be low. In contrast, porous or microporous layers which are used to support a functional coating in known water vapour transport membranes represent a large portion of the material cost of the membrane.

In summary, the use of nanofibre-based membranes has the potential to greatly reduce resistance to water vapour transport in the final membrane material, leading to significant increases in device performance and overall energy efficiency in buildings. Increased performance in these nanofibre membranes will also improve ERV performance in freezing conditions. During freezing conditions, increased water vapour transport performance allows more water vapour from the exhaust stream to pass through the membrane, which decreases the amount of condensation present and reduces the likelihood of frost and ice forming in the exchanger channels. In terms of longevity, fibrous substrates offer an advantage over current generation microporous substrates in that they will not suffer from pore collapse and stress induced cracking. The membranes, generally being less than 100 microns in thickness will have high heat transport rates in enthalpy exchangers. Membranes thinner than 200 microns are preferred and more preferably less than 100 microns.

Nanofibrous layers have been incorporated into known (prior art) membranes used for breathable performance clothing, protective clothing, ultra-filtration, water purification, chemical absorption and other applications. Generally at least one support layer is used to support one or more nanofibrous layers, and in some cases other additives are used. Most of the previously described membranes incorporating nanofibres are porous and will transport water vapour, but are not selective for water vapour over other gases, and are therefore not suitable for selective water vapour transport applications such as ERV devices. Membranes incorporating nanofibrous layers into multiple tier 'sandwich-like' structures with the application of various coatings on the surfaces of these materials have also been for ultra-filtration and water purification applications.

In general, membranes for water filtration applications are not suitable for water vapour transport applications. Water filtration membranes are designed to be in contact with liquid water under relatively high pressure. Fouling is often a concern in water filtration, but is typically of little concern in water vapour transport applications. Water filtration membranes generally have thick and dense support structures (compared to vapour transport membranes) to resist the higher differential pressures across the membrane that are experienced during water filtration. Water filtration membranes are also generally designed to either be hydrophilic or be hydrophobic depending on the type of filtration; this may not be entirely desirable in vapour transport applications. Since water filtration membranes are in contact with liquid water, they tend to either have low selectivity, low permeance, or both when utilized in gas-to-gas, water vapour transport applications.

The present approach involving use of a nanofibrous layer with a selective water vapour permeable polymer coating can allow a selective, water vapour permeable layer to be formed on top of a macroporous support layer. Herein macroporous refers to materials with average pore sizes greater than about 10 micron, to sizes greater than 10 mm. Conventionally a difficulty with fabricating membranes based on these macroporous materials is that it is very difficult to form a thin, water permeable, selective layer on the surface of these materials. With pores greater than a few microns, the pores tend to be filled by the polymer solutions rather than supporting a thin surface film. Since these macroporous materials are at least as thick (and typically much thicker) than the pore size of the material, the selective and permeable polymer layer will be relatively thick if the pores are filled with the polymer. This will lead to low permeance. Another way to fabricate selective membranes based on macroporous support materials is by laminating a selective, water vapour permeable polymer film to the support. However, defect free monolithic and homogenous polymer films cannot be easily manufactured at thickness below 5-15 microns. This means that the selective-permeable layer will still be quite thick in comparison to a film cast on the surface of a microporous material. The resistance to water vapour transport due to the thickness of these films will lead to poor performance in water vapour transport applications.

A novel method to create a thin, selective, water vapour permeable polymer layer on top of a macroporous support layer is by utilizing a nanofibrous layer as a framework to support the water vapour permeable polymer as described herein. A further advantage is that if the water vapour permeable polymer is cast from solution to fill or partially fill the nanofibrous layer (rather than remaining as just a surface film), it may simultaneously adhere the nanofibrous layer to the support layer.

Such a method for fabricating a thin selective water permeable layer can be utilized on a wide variety of macroporous support materials. Support materials which are formable, may be desirable as support layers. This type of formability can lead to selective water vapour permeable membranes which, due to the choice of support, can be formed into self-supporting three-dimensional structures. Formed membranes have distinct advantages in fabricating membrane modules, in that it may be possible to eliminate components such as separately fabricated flow fields, support ribs, and the like, from the module design. This can decrease material costs and the complexity of manufacture. Furthermore, using the membrane to form flow channels (i.e. where the channel walls are made from the permeable membrane) can significantly increase the active surface area of membrane in the module which can, in turn, increase performance per unit volume, and decrease cost. The coated nanofibrous layer, is essentially a fibre-reinforced composite. This imparts increased strength into the selective layer. When combined with a formable macroporous support layer, this can allow the selective water vapour permeable layer to be formed along with the support, without damaging or compromising the selective layer. During some forming operations, the selective layer is elongated or stretched during forming. This can cause the selective layer to become thinner, and can further increase the water vapour transport performance of the membrane.

Nanofibrous Layer

The nanofibrous layer may be produced via various known techniques including, but not limited to, drawing, chemical vapour deposition, template synthesis, self assembly, phase separation, electro-spinning, and force spinning. Electro-spinning and force-spinning have the greatest potential for industrial scale-up, but the present membranes can incorporate nanofibrous material produced via any suitable nanofibre fabrication process.

Electro-spinning involves drawing a polymer solution into thin fibres using a high voltage electric field. In a typical set up, illustrated in FIG. 1A a polymer solution 15 is placed in a syringe 10 and an electrode 20 is connected to the metallic needle tip 25. An air gap is maintained between the needle tip 25 and a grounded collector 30. When sufficient voltage is applied to overcome the surface tension and viscous forces in the polymer solution, the solution is drawn as a jet 35 from the needle tip 25 towards the collector 30. As the polymer jet 35 is drawn, solvent evaporates from the fibre, the fibre surface becomes charged, and repulsion forces cause the jet to whip, further drawing the fibre to a thinner diameter. It is possible to obtain continuous fibres in the 10-1000 nanometer range by this method.

The electro-spinning process is highly complex, and numerous variables are involved in the controlled synthesis of electro-spun nanofibres. Variables include: polymer-solvent-solution variables; concentration, conductivity, viscosity, surface tension, solvent volatility, dielectric constant, molecular weight and structure of the polymer. Process variables include: spinning distance, spinneret needle geometry, solution feed rate, environmental temperature and humidity, voltage, and collector geometry. Those skilled in the act can effectively manipulate these variables to manufacture polymeric nanofibres of controlled geometry and diameter.

Various methods have been described for producing sheets or continuous rolls of nanofibrous substrates. This includes multiple needle and multiple pass systems, or a rotating electrode which is wet in a bath of polymer solution. It is often desirable to fabricate nanofibrous layers for membranes on support layers for improved strength and ease of handling.

A nanofibrous layer can be electro-spun directly onto a macroporous support layer. The thickness of the nanofibrous layer will be determined, for example, by the fibre diameter, the deposition time, and the geometry of the electro-spinning set-up. During the electro-spinning process, the solvent in the polymer spinning solution is evaporated as the fibres are formed. This is advantageous since the fibrous layers will be dry or nearly dry upon deposition on the support layer. Further drying may thus be unnecessary, however complete drying or curing can be achieved through convective heating and drying, infrared drying, vacuum drying or other drying and curing methods.

Most commercial polymers that can be dissolved into solution can be electro-spun, and have been reported in the literature. Thus nanofibrous layers can be made from a wide variety of polymers including but not limited to: polyvinyl alcohol (PVA); ethylene-vinyl alcohol (EVA); cellulose materials such as alpha-cellulose, cellulose acetates (CA), carboxymethlycellulose (CMC), and ethyl cellulose (EC); bio-polymers such as chitosan, collagen, dextran, and gelatin; polyamides such as nylon-6, nylon-12, and polyacrylamide; polyacrylic acid (PAA); polyacrylonitrile (PAN); polycaprolactone (PCL); polyethylene oxide (PEO); polyesters such as poly(ethylentere-phthalate) (PET) and poly (butylene succinate) (PBS); polyacids such as poly(lactic-co-glycolic acid) (PLGA), polylactic acid (PLA), and poly-L-lactide (PLLA); acrylics such as poly(methyl methacrylate) (PMMA); polysulfone (PSU); poly(etherimide) (PEI); polyimide (PI); polybenzimidazol (PBI); polystyrene (PS); polyurethanes (PU) and polyurethane co-polymers; vinyl polymers such as poly(vinyl chloride) (PVA) and poly(vinyl fluoride) (PVDF); and poly(vinyl pyrrolidone) (PVP).

The nanofibrous layer incorporated in the present selective water vapour transport membranes is preferably not soluble in water, so that the membrane is washable and able to withstand condensation in the end-use application. Nanofibrous polymers which are water-soluble can be cross-linked to render the nanofibrous layer insoluble in water. Cross-linking can be achieved through various known methods including UV radiation or heat, and can be accelerated by initiator additives. Cross-linking may also be achieved directly through use of reactive cross-linking agents. The cross-linking mechanism will depend on the polymer used for the nanofibrous layer. It may be desirable to use a polymer that is insoluble in water in order to eliminate the need for cross-linking. This however will mean that a non-aqueous solvent system must be utilized for formation of the nanofibrous layer. Non-aqueous solvents are often flammable, toxic, or both, increasing the complexity of manufacturing. Solvent recovery may be required, increasing the manufacturing cost of the membrane.

The selection of polymer for the nanofibrous layer will depend on the choice of selective water vapour permeable polymer coating and any support material utilized. The nanofibrous layer may be hydrophobic or hydrophilic, depending on the functional coating and the desired architecture for the membrane to be fabricated. For example, using a partially hydrophilic nanofibrous layer and an aqueous functional coating solution will generally lead to a filled nanofibrous layer. On the other hand, an aqueous functional coating solution applied to hydrophobic nanofibrous layer will not wet or be drawn into the nanofibrous layer, and will generally create a surface-coated nanofibrous layer.

One advantage of utilizing fibres with nanometer dimensions is that, as fibre diameters decrease, the ratio of surface to bulk atoms in the fibre increases dramatically. Surface atoms are known to be more active, and thus fibres in the nanometer range may demonstrate improved reactive, anti-microbial, anti-flammability, and/or sorption properties. Further, a decreased fibre diameter greatly increases the surface area of nanofibrous layers over micro-fibrous layers, which may be beneficial in certain surface active applications.

Additives with beneficial properties can be incorporated into the nanofibrous layer of the present membranes. Since this layer will have high surface area, the active area of the additive may also be increased. Thus antimicrobial, anti-flammability, or absorptive properties of the membrane may be greatly improved by incorporating additives into the nanofibrous layer.

In some embodiments of the present membranes, the nanofibrous layer may include one or more different types of polymers or be made from solutions of the same polymer but with different additives. Blended polymer solutions with desirable properties may be electro-spun to form nanofibres of two or more polymers. Also, two or more polymer solutions may be electro-spun from independent needles, and deposited simultaneously to a collector to produce a network of two or more intertwined nanofibrous polymers in the same layer. This multiple spinning nozzle method may allow controlled distribution of additives in the nanofibrous layer by controlling deposition of fibres from different solutions.

Nanofibrous layers can also be created on top of other nanofibrous layers, where each layer is a different polymer, or each layer has a different fibre diameter or geometry or incorporates different additives. This may be useful in creating structures with increasing or decreasing pore size or porosity, or creating layers with varying hydrophilic and hydrophobic character.

In preferred embodiments of the present membranes, the nanofibrous layer is deposited directly onto a macroporous support layer via electro-spinning or another suitable nanofibre formation method. This process can be continuous allowing rolls of the supported nanofibrous material to be fabricated. This process may also be part of a continuous membrane fabrication line, with a functional coating being applied following the formation of the supported nanofibrous layer.

Coating Layer

The selective water vapour permeable polymer coating applied to the nanofibrous layer functions as a barrier to gas mixing and contaminant transport. The functional coating is highly water vapour permeable and highly selective for water vapour, although sorption and permeation of liquid water is also desirable. The functional coating is typically applied as a solution. As used herein, particularly in reference to the functional coating, "solution" includes dispersions and suspensions, as well as solutions of the functional polymer. The functional coating solution may also contain desirable additives, such as antimicrobials, flame retardants, and desiccants.

Water transport is driven by diffusion through the functional polymer by a concentration gradient from the wet side of the membrane to the dry side of the membrane. It is desirable to reduce the thickness of the functional coating in order to increase the water transport rate through the membrane, however this must be done without unduly compromising the ability of the functional coating to act as a barrier to gas mixing.

The permeability of the functional coating to water vapour will also depend on the solubility and diffusivity of water vapour in the polymer, as generally described in the membrane science literature: permeability=diffusivity×solubility. Permeability is thus dependent on the nature of the functional polymer, which includes the polymer chain packing and orientation, functional groups in the polymer chain, polarity, degree of crystallinity, polymer additives, cross-linking density, the presence of fillers, and degree to which the polymer is plasticized in the presence of water. Solubility depends on the chemical nature of the functional polymer and the species which is being absorbed into the polymer layer, for example certain polymers will favorably intake a polar molecule, such as water due to their chemical nature. Water-soluble polymers will thus have high solubility for water and water vapour, and the sorption of water vapour into the polymer will be thermodynamically favorable. Cross-linking these polymers will reduce the solubility to some extent, however cross-linking allows the polymer to swell somewhat in the presence of a soluble species without dissolving the polymer. High levels of swelling in certain polymers will lead to the formation of liquid channels through the polymer structure. If water is the solute, this is often accomplished spontaneously due to the polymer undergoing internal phase separation, as thermodynamic forces cause the alignment of hydrophilic groups within the polymer. The presence of these 'aqueous channels' in the solid polymer layer has a profound effect on diffusive transport in the polymer, since transport through the liquid phase is orders of magnitude greater than through the solid phase. Generally, elastomeric polymers are less constrained in motion than amorphous polymers, which themselves are less constrained than crystalline polymers. This is related to the free volume in the polymer as polymer molecules move within the solid by migrating to holes within the polymer matrix. Generally, the more mobile a polymer chain is within the coating material, the greater the diffusive transport rate in the material. Thus, diffusion is greatly increased in polymers in which the chains are mobile. A combination of high sorption for water and water vapour and rapid diffusion of water vapour in the polymer matrix leads to functional polymers with high permeance. These polymers will be desirable functional coating materials for the present invention.

The functional polymer coating is preferably flexible to allow easier handling, pleating, and processing of the final membrane to form ERV cores or other such devices. Thus elastomeric or amorphous, non-crystalline polymers are preferred, as they are generally flexible.

After drying and curing the functional coating should be insoluble in water as condensation will typically occur in the device in the end-use application. In ERV applications, since the membrane is interfacing with incoming and outgoing building air, will be desirable to be able to periodically wash the membrane.

Various functional coatings can be used including, for example, cellulose and its derivatives such as carboxymethyl cellulose, ethyl cellulose, cellulose acetate; polyethers such as polyethylene oxide, polyethylene glycol, polyphenyleneoxide; vinyl alcohols such as polyvinyl alcohol; and acrylics such as polyacrylates and polyacrylamides. However, some of these functional coatings may be difficult to render insoluble in water, have poor selectivity, or insufficient permeability for ERV applications.

Thermoplastic elastomers (TPE) are candidate coating materials, as some such materials offer high permeance (as discussed above) and can be produced as copolymers with water permeable polymers to produce polymers with high water vapour transport rates and structural integrity. A wide range of unique TPE polymers are available, with various grades made specifically for water vapour transport. Families include thermoplastic polyurethanes, thermoplastic polyesters, thermoplastic polyamides, and styrene block copolymers. These polymers are available commercially for example Estane (Lubrizol), PEBAX (Arkema), Arnitel (DSM), Hytrel (DuPont), and Kraton (Shell). These polymers are typically melt processed and are available in sheet form as 'breathable films'. The water vapour permeance of these materials is sufficient for some applications, however, the lower limitation of film forming (typically 5-15 microns) tends to lead to lower than required water vapour transport performance in high water vapour transport applications such as ERV applications.

Polyurethane dispersions such as polyurethane-polyether copolymers are suitable flexible, durable, water permeable coatings that can be applied as aqueous solutions and then cross-linked. For example, non-ionic polyurethane-polyether polymers (such as those for example, available from Lubrizol under the name PERMAX 230) containing a polyurethane backbone 'hard' segment for mechanical strength and polyethylene oxide (PEO) 'soft' segment side chains for water permeability and water transport functionality have been found to be suitable. Since the polymer is water-soluble, some degree of cross-linking is required to render the polymer sufficiently insoluble. For these coatings, the cross-linking will generally occur on carboxyl groups in the polyurethane segments of the polymer chain. This cross-linking mechanism renders the polymer coating less soluble in liquid water, while the water transport properties of the soft (PEO) sections of polymer are adequately retained. Suitable cross-linking agents for these polymers include aziradines, melamines, isocyanates, and carbodiimides.

Polymer resins specifically designed for water vapour transport (e.g. PEBAX MV3000, PEBAX 1074, and 1657) may be dissolved in appropriate solvents and then applied to the nanofibrous layer as the functional coating. These polymers are more difficult to dissolve, but have the added benefit of being insoluble in water once they are cast.

Certain ionomeric polymers such as carboxylated or sulphonated polymers demonstrate high water vapour transport rates due the ability of these polymers to swell and form 'aqueous channels' in the presence of liquid water or water vapour. Commercially available sulphonated polymers such as sulphonated polystyrene (sPS), perfluoronated sulphonic acid (PFSA), sulphonated polyetheretherketone (sPEEK), sulphonated polyethersulphone (sPES) andsulphonated styrene-ethylene-butylene-stryene (sSEBS) tend to have very high water vapour transport and can be highly selective for water vapour. These polymers tend to display swelling phenomena, forming aqueous channels in the polymer and high water permeance. Excessive swelling will decrease the dimensional stability of the polymer and may lead to durability issues in the material and devices manufactured from the membrane when exposed to liquid water. The extent of the swelling can be controlled by the sulphonation degree, and structural nature of the polymer. Swelling may also be decreased by physically constraining the polymer on or within a porous framework. Nanofibrous layers have high surface areas, and will provide an excellent substrate for holding swellable polymers. Thus water vapour transporting ionomeric polymers can be used as functional coatings applied to the nanofibrous layer in the present membranes. However, these materials tend to have higher cost than other functional polymers, and the use of these materials may not be economically feasible for certain applications.

The water vapour permeable polymer coating may also be a mixture of various polymers, for example, a highly permeable, high cost, polymer blended with a lower cost, lower permeability polymer may impart increased permeability in the coating without substantially increasing the cost. A non-limiting example would be to make a selective highly water vapour permeable coating by blending a small portion of expensive sulphonated polymer with low cost water permeable polyether-polyurethane.

Additives to Coating

The properties of the final membrane can be further enhanced for the particular end-use application by incorporating one or more additives into the functional polymer coating that is applied to the nanofibrous layer. Examples include:

(a) improved flame resistance through the use of flame retardants; and/or (b) improved microbial resistance through the use of microbicides to resist the growth of mould, bacteria and/or fungus; and/or (c) increased water absorption and permeation through the use of desiccants and/or other polymers; and/or (d) sorption or masking of odours, VOCs, or other contaminants.

Flame retardant additives can be added to the functional coating to improve the flame resistance of the final membrane. This is particularly important if the nanofibrous layer and/or support layer (if present) are not flame resistant, in which case, the coating can contain sufficient additive to make the final membrane flame resistant. Various types of additives are suitable for this purpose. These include intumescents such as expandable graphite and phosphonates; aluminum trihydrates; metal hydroxides, such as aluminum hydroxides and magnesium hydroxides; antimony compounds such as antimony trioxide, antimony pentoxide and sodium antimonite; boron compounds, such as boric acid, borax, zinc borate; other metal compounds, such as molybdenum compounds, titanium compounds, zirconium compounds, zinc compounds such as zinc stannate, zinc hydroxy-stannate; phosphorus compounds such as red phosphorus and ammonium polyphosphate; melamine; and guanidine. Ideally, the flame retardant additive is not soluble in the functional coating solution, and can be easily dispersed in solution. Also it is desirable for the additive to be non-toxic, and effective at low loadings.

The nanofibrous layer, functional coating, and optional support layer used in preferred embodiments of the membranes described herein generally do not promote, and in some cases resist, growth of mould and bacteria (unlike cellulose and other previously used substrates and coatings). The addition of microbicides to the coating can further deter the growth of mould, fungus, and bacteria in an enthalpy exchanger or other device. For enthalpy exchangers which are part of an air handling system, the materials can used in a dark, humid, and warm environment, which is favorable to mould and bacterial growth. The addition of these additives can be beneficial even if the membrane materials utilized are not capable of being degraded. Suitable additives for this purpose include Microban®, Bioban (bronopol), Dowicide (2-phenylphenol), Filmguard (3-iodopropynylbutylcarbamate), Amical (diiodomethyl-p-tolylsulfone), and Canguard (1,2-benzisothiazolin-3-one).

In some cases it may be desirable to add desiccants to the functional coating to increase the water carrying capacity of the material. Preferably the desiccants added to the coating are selected and used in quantities such that they do not adversely increase gas permeation through the membrane and do not dissolve in water over time. Suitable desiccants may include lithium chloride, silica, molecular sieves, zeolites, alumina, calcium chloride, and calcium sulphate, although some of these will tend to be water-soluble.

Additives such as the above may have the benefit of sorbing and blocking odours and other contaminants in the air stream.

Water-soluble polymers can be added to the functional coating as viscosity-modifying and film forming agents to improve to consistency of the coating and increase ease of manufacture. Surfactants can be added to the functional coating to improve the spreading of the coating on the substrate or decrease foaming in the coating solution during processing.

Support Layer

As mentioned above, the present membranes preferably further comprise a support layer, for example, to provide structural rigidity and to make the membrane easier to handle and use. Since the nanofibrous layer is typically quite thin and fragile, it is beneficial to have a support layer onto which the nanofibrous layer can be fabricated for ease of handling between the nanofibre spinning process, and the coating process. Once the functional coating is applied, the membrane may benefit from the increased structural integrity provided by the support layer. The support layer may be important for down-stream processing and incorporation of the membrane into devices and enthalpy exchangers. For example, the support layer may improve the ease with which the membrane can be pleated, rolled, formed, welded, taped, potted, or handled in various manufacturing processes. The support layer may also give the membrane sufficient strength and/or stiffness to be utilized in a device under the required operating conditions. For example the membrane may have to support itself between ribs or channels under an applied differential pressure at elevated temperature without undue deformation. The support layer may allow the membrane to be thermally-, vibration- or ultrasonically-welded or joined in some manner to itself or other components.

The support layer preferably provides desirable mechanical properties without imparting any significant increased resistance to water vapour transport. For this reason macroporous materials with high porosity are preferred as support layers. The support material is selected so that it is physically and chemically compatible with the rest of the membrane system. In some applications, it is desirable for the support material to be non-flammable and/or to resist the growth of mould, bacteria, or other microbes.

The support layer may be any suitable porous material, including but not limited to: non-wovens, wovens, polymer meshes, metal meshes, filters, fibrous materials, sintered carbon, sintered metals, sintered plastics, and foams. Non-woven materials made from polymeric fibres have been found to be particularly suitable for ERV applications. These materials are widely available, relatively inexpensive, and manufactured from a wide range of polymers. Also metal mesh structures may be utilized as support layers, with the added benefit of being easily pleated, corrugated, or otherwise formed prior to or following membrane fabrication.

Fabrication of Membranes

In a coating procedure, a solution of functional polymer is cast onto the nanofibrous layer after which the solvent is evaporated leaving a solid polymer coating on the nanofibrous layer. If the polymer solution has an affinity for the nanofibrous layer, then the nanofibrous layer may become filled with the polymer solution, and when the solvent is evaporated, there will be functional polymer filling or partially filling pores in the nanofibrous layer. The extent of the filling will depend on a number of variables in the solution including, for example, the concentration and type of polymer in the solution, the solvent, and the surface tension of the solution. The extent of the filling will also depend on a number of properties of the nanofibrous layer, including the pore size, fibre diameter, and the surface energy of the nanofibrous polymer. The extent of the filling will also depend on the application method, and the volume of functional coating solution deposited on the nanofibrous layer. In order to increase water permeance of the final membrane, preferably the amount of functional polymer applied should be only sufficiently high to satisfy the selectivity requirements of the application.

Methods for forming the present membranes are described in more detail below. In some embodiments multi-step processes may be utilized, while other embodiments may involve fabrication in one continuous process.

A functional polymer solution can be applied directly to the nanofibrous layer or supported nanofibrous layer by rod, blade or similar device. Other suitable application methods include dip-coating, Mayer rod, blade over roller coating, direct gravure, offset gravure, kiss coating, slot die and spray-coating. The coated membrane is then typically passed through a dryer or oven to remove excess solvent and cause the coating to adhere to the nanofibrous surface. Drying may be achieved, for example, through heated air drying by convection, by the use of infrared heaters, or a combination of the two. The elevated temperature in the dryer may initiate or expedite cross-linking of the polymer coating. Depending on the type of coating polymer, othe cross-linking techniques may be used. Production of these membranes can be completed on roll-to-roll equipment in a continuous process, allowing for high volume, low cost manufacturing.

Figure 1B:
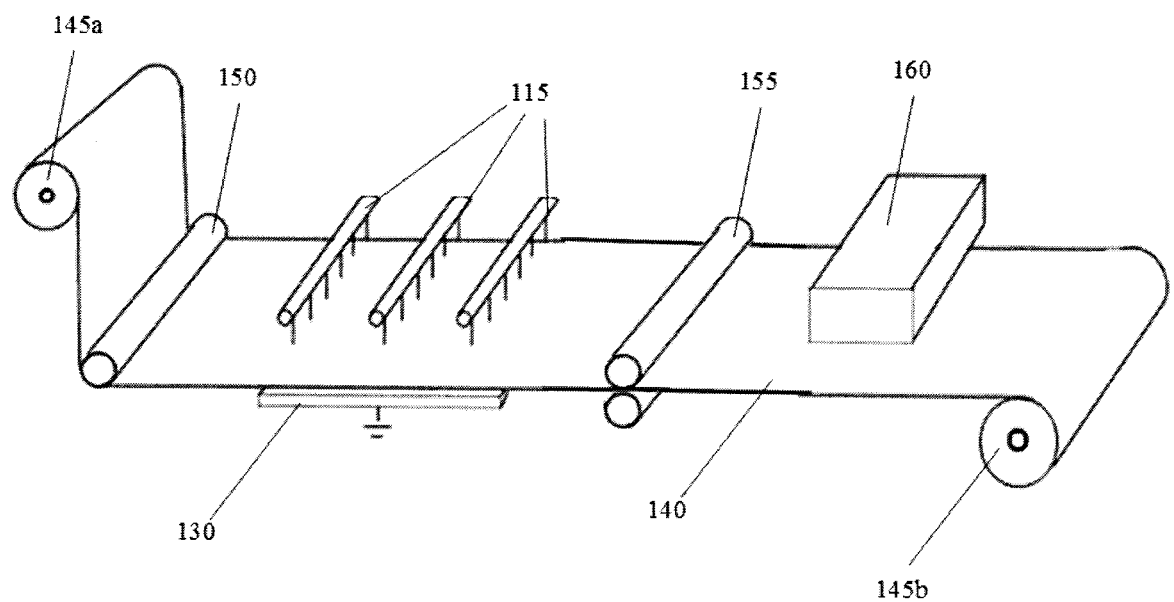
FIG. 1B is a simplified diagram illustrating an example of a nanofibre spinning and coating roll-to-roll apparatus and process that can be used to prepare a supported, coated nanofibrous layer.

FIG. 1B is a simplified diagram illustrating an example of a roll-to-roll apparatus and process that can be used to prepare a supported, coated nanofibrous layer. Three rows of syringe apparatus 115 (similar to those described in reference to FIG. 1A) are used to electro-spin and deposit a nanofibrous layer on a macroporous support layer 140 which is tensioned and moved between rollers 145a and 145b, passing under roller 150. A grounded collector 130 is positioned underneath macroporous support layer 140 directly below syringe apparatus 115. Once the nanofibrous layer has been formed on the support layer, a functional coating solution is applied using a suitable roll-coating or alternative coating apparatus 155, and then the solvent is removed and the membrane is dried using oven, heater, or drier 160 before being collected on roller 145b.

Depending on the coating method and the chemical properties of the nanofibrous layer, support layer, and the functional coating solution, the nanofibrous layer and support layer may be wetted during the coating process. In this case the coating may act to bind the layers together forming the final membrane. However, in order to maintain high water vapour permeance in the membrane, low coating utilization is required, but not so low as to compromise the selectivity of the membrane. A balance between the nanofibre dimensions, the nanofibrous layer thickness, density, pore size, porosity, and the coating formulation, application method, and uniformity and thickness, can be achieved by those skilled in the art leading to the fabrication of membranes with high permeance and high selectivity.

A preferred membrane embodiment can be made by spinning a low loading of fibrous layer with less than 500 nm diameter fibres on the surface of a macroporous support layer. This fibrous layer will have low weight, low thickness, and high porosity. The nanofibrous layer is subsequently coated with a solution of a functional polymer with high water vapour permeability which will wet the nanofibrous layer and the macroporous support layer. Excess coating is mechanically removed, and the solvent from the coating is evaporated. The result is a supported nanofibrous membrane which is bound together by the functional coating. This membrane will be highly permeable to water and water vapour, and substantially impermeable to air, gases, particulates, and contaminants.

In some embodiments the functional coating solution may be incompatible with the nanofibrous layer and will not wet the nanofibrous layer. In this case a thin coating may be cast on the surface of the nanofibrous layer. This has the advantage of potential for high permeance (due to low resistance in the thin selective coating layer), but the disadvantage of not binding the nanofibrous layer to the support layer. In this case the nanofibrous layer preferably should be capable of adhering to the support layer. This can be enhanced by priming the support layer with a binding agent, adhesion promoter, coating, corona treatment or similarly treating the support layer, prior to spinning the nanofibrous layer on the support layer. The final membrane may also be post-treated by heating, calendaring, laminating, or similar processes to assist in binding the components together.

In one embodiment comprising two nanofibrous layers, a first nanofibrous layer is not wetted by the functional coating, and a second nanofibrous layer is wetted by the coating. This allows preferential coating of one nanofibrous layer over the other, or preferential binding of one nanofibrous layer to the support layer.

When multiple nanofibrous polymers are spun together in a layer, the functional coating may only wet one of the nanofibrous polymers and this may allow control of the extent of coating depending on the ratio of the different nanofibres.

In another embodiment, the nanofibrous layer may be coated with a low concentration coating (high solvent content) or binding solution to adhere the nanofibrous layer to the support layer, and prime the nanofibrous layer for application of a functional coating layer. This priming process essentially coats the support and nanofibrous layers adhering them together. This may also enhance the adhesion of the functional coating layer to the nanofibrous layer.

A further method of fabricating a membrane is to fill the nanofibrous layer with a liquid prior to casting the functional coating on the surface of the nanofibrous layer, and then evaporating or removing the solvent(s). This can allow a continuous functional coating to be deposited onto the surface of the nanofibrous layer without substantially filling the nanofibrous layer. This can have the advantage of reducing the thickness and thus increasing the water vapour permeance of the functional coating layer. The final membrane however may need to be bound together by a pre-treatment or post-treatment process as described previously.

Another embodiment of a method of fabricating a membrane is similar to the above method, differing in that the nanofibrous layer is filled with a first coating solution with a low concentration of functional polymer. The polymer and solvent may be the same as the second coating solution, but must wet the nanofibrous layer and the support layer. The liquid filled nanofibrous membrane is then coated with the second functional polymer solution, having a higher concentration of polymer, and thus higher viscosity and density. Since the nanofibrous layer is filled with the first low concentration solution, the functional polymer will not fill the nanofibrous layer substantially. The membrane is then dried to remove the solvent. This simultaneously binds the support layer to the nanofibrous layer, and creates a thin selective water vapour permeable coating on the surface of the nanofibrous layer.

As described above, the present membranes for selective water vapour transport comprise a nanofibrous layer and water vapour permeable polymer coating. The membrane may also include one or more support layers, and one or more additional nanofibrous layers with varying degrees of surface coating or filling in each layer. As such, the components of the membrane may be incorporated and arranged in various manners. Non-limiting examples of potential membrane configurations are described below.

Figure 2A:
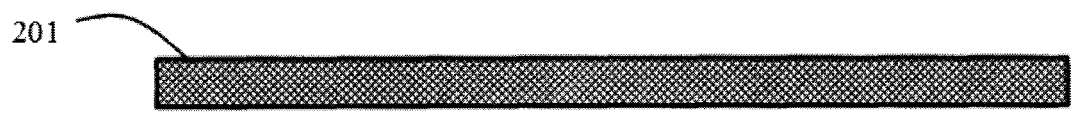
FIGS. 2A-D illustrate embodiments of a water vapour transport membrane comprising a nanofibrous layer and a water vapour permeable polymer coating, without a support layer.
Figure 2B:
Figure 2C:
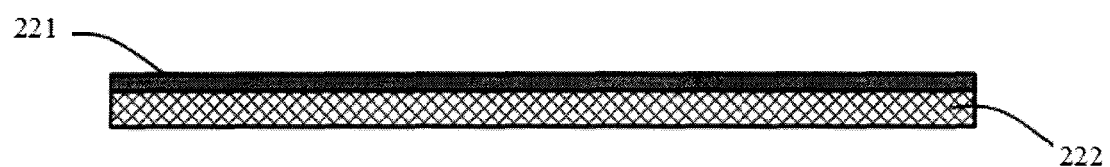
Figure 2D:

FIGS. 2A-D illustrate various example embodiments of water vapour transport membranes comprising a nanofibrous layer and a water vapour permeable polymer, without a support layer. FIG. 2A shows a nanofibrous layer which is completely filled with a selective, water vapour permeable polymer (201). The nanofibrous layer acts as a framework for holding the selective permeable polymer, and the functional polymer also acts a binder, adhering the nanofibres together and increasing the mechanical strength of the composite membrane. FIG. 2B shows a partially filled nanofibrous layer (211); the functional polymer binds the nanofibres together, increases the strength of the material, and may impart sufficient selectivity to the membrane while maintaining high water permeance. FIG. 2C shows a nanofibrous layer (222) that has been coated with a thin surface layer of selective, water vapour permeable polymer (221). The nanofibrous layer 222 will have virtually no resistance to water vapour transport, while supporting the selective coating layer 221. FIG. 2D shows a partially filled nanofibrous layer (232) with a thin surface layer of selective, water vapour permeable polymer (231). The partially filled nanofibrous layer 232 contains a binding polymer that adds mechanical strength and structural rigidity to the membrane, while not significantly increasing the resistance to water vapour transport in the nanofibrous layer. The coating layer 231 is thin and highly permeable to water vapour, but is selective not allowing the transport of gases and other contaminants.

Figure 3A:
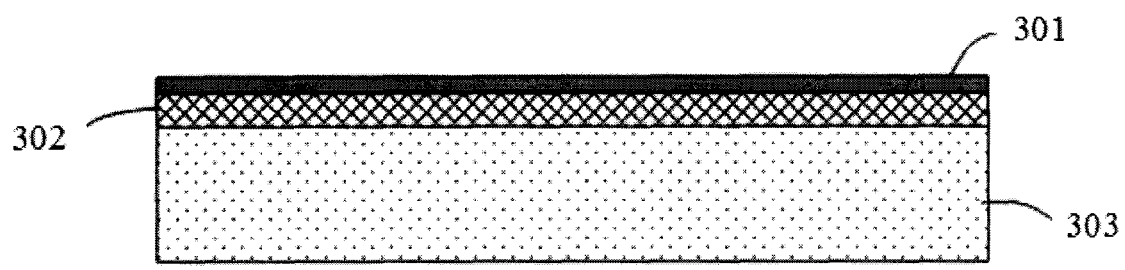
FIGS. 3A-F illustrate embodiments of a water vapour transport membrane comprising a nanofibrous layer, a water vapour permeable polymer, and a macroporous support layer.
Figure 3B:
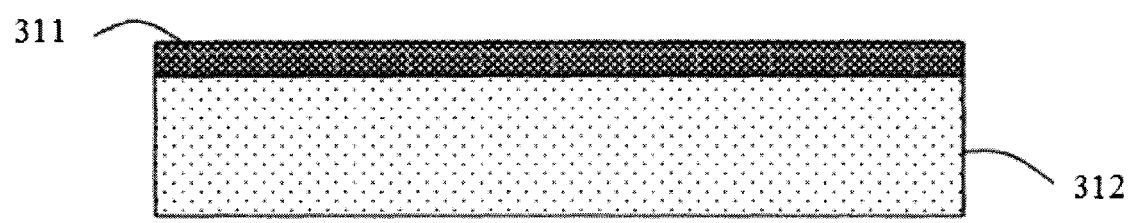
Figure 3C:
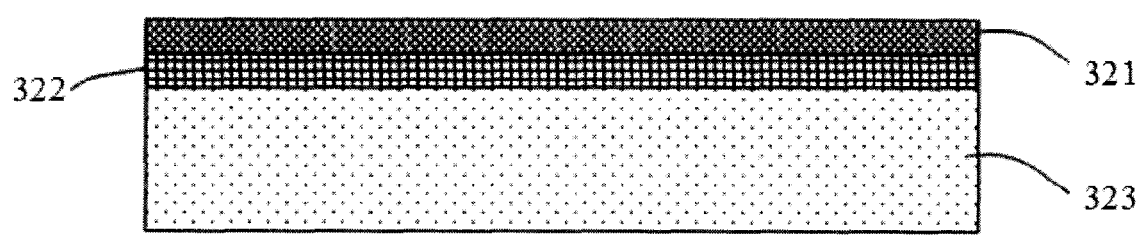
Figure 3D:
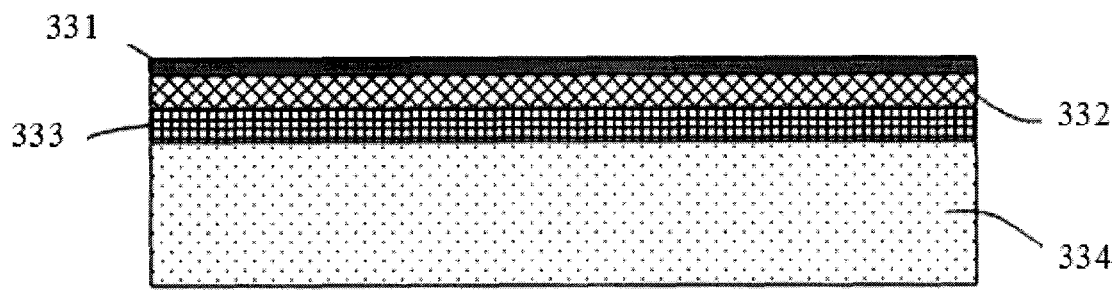
Figure 3E:
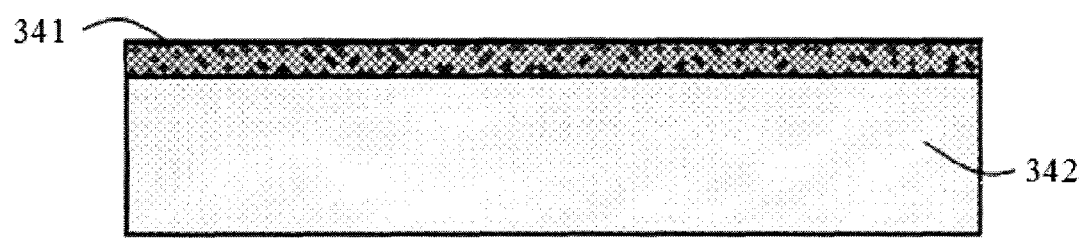
Figure 3F:
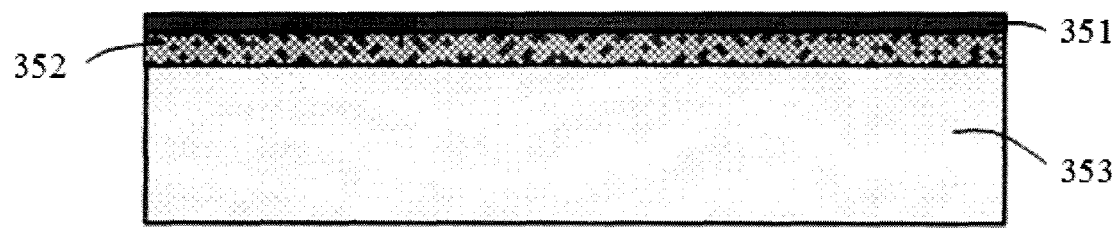

FIGS. 3A-F illustrate various example embodiments of water vapour transport membranes comprising a nanofibrous layer, a water vapour permeable polymer, and a support layer. FIG. 3A shows support layer (303) with a nanofibrous layer (302) disposed on one surface thereof. The nanofibrous layer 302 has been coated with a thin surface layer of selective, water vapour permeable polymer (301). FIG. 3B shows support layer (312) supporting a nanofibrous layer that has been filled with a selective, water vapour permeable polymer (311). FIG. 3C shows a support layer (323) supporting a first nanofibrous layer (322) that is not filled, and a second nanofibrous layer that is filled with a selective, water vapour permeable polymer (321). The first nanofibrous layer may contain a binder for holding the fibres together and bonding it to the support layer 323. FIG. 3D shows a support layer (334) supporting a first nanofibrous layer (333) and a second nanofibrous layer (332). The second nanofibrous layer has been coated with a thin surface layer of selective, water vapour permeable polymer (331). The first and/or second nanofibrous layers may contain a binder for holding the fibres together and bonding them to the adjacent layer(s). FIG. 3E shows a support layer (342) supporting a nanofibrous layer (341), with both layers being partially filled with a selective, water vapour permeable polymer. FIG. 3F shows a support layer (353) supporting a nanofibrous layer (352), with both layers being partially filled with a selective, water vapour permeable polymer. The partially filled nanofibrous layer 352 has been coated with a thin surface layer of selective, water vapour permeable polymer (351). The use of a support layer is generally preferred as the nanofibrous layer tends to be fragile, and a support layer facilitates handling and manufacturing in down-stream processes and end-use applications. The support layer may also allow the membrane to be formed or pleated after fabrication. The support layer has very low resistance to vapour transport, and is preferably a macroporous open structure.

EXPERIMENTAL EXAMPLES

Example 1

Supported Nanofibrous Layers Compared to Known Microporous Substrates

Various microporous substrates were compared to uncoated, supported nanofibrous layers. A microporous polypropylene substrate was obtained from Celgard LLC, under the name Celgard 2500; the thickness was 25 micron, the average pore size was 0.204×0.054 micron (average dimension about 0.13 micron) and the porosity was 55%. A microporous silica-polyethylene membrane, was obtained from ENTEK International; the thickness was 191 micron, the average pore size was 0.065 micron, and the porosity was 63%.

Figure 4:
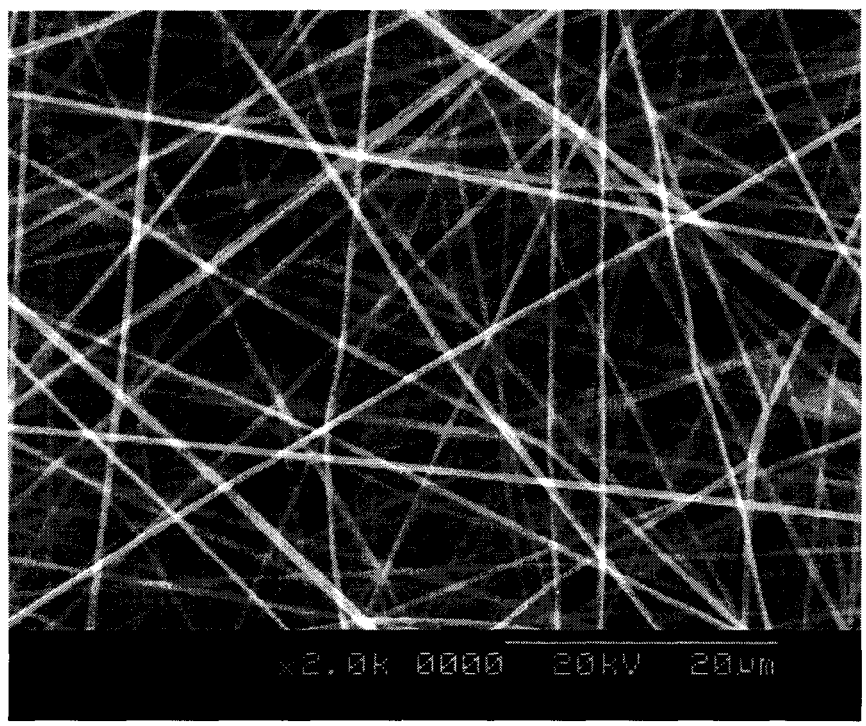
FIG. 4 is an electron micrograph of the surface of an electro-spun polyacrylonitrile nanofibrous layer.

A non-woven support layer, polyester non-woven (Reemay 2004/2006), 1 oz/sq. yd. was obtained from Fiberweb. Polyacrylonitrile (PAN) was obtained from Scientific Polymer Products with an average molecular weight of 150 000 g/mol. A solution of 10% weight PAN in dimethylformamide (DMF) was created under stirring at 70° C. The PAN solution was placed in a 10 mL syringe with an eighteen gauge hypodermic needle, 1.5" length with bevel removed. The syringe was mounted 15 cm from a rotating grounded collector onto which the non-woven support layer was affixed. An electrode was placed on the needle tip. A 17.5 kV potential was applied to the needle tip causing polymer to spurt from the syringe towards the collector. A syringe pump was used to maintain a substantially constant supply of polymer solution to the needle tip, at a rate of about 0.02 mL/min. The collector target was a drum rotating at a rate of 0.5 m/min. The drum diameter was 10 cm, and the width covered with the non-woven support layer was 32 cm. The syringe was traversed back and forth across width of the drum at a rate of 3 cm/min at a substantially constant distance of 15 cm. Samples of supported nanofibrous layers with three different loadings of nanofibres were created by spinning for 1 hour (#1A), 3 hours (#1B), and 5 hours (#1C). The porosity of each sample was determined by weighing the samples dry and soaking them in a wetting fluid. The air permeation and water vapour permeation were measured for each sample. The samples were evaluated under SEM to determine the average pore size and fibre diameter. The average fibre diameter was 483 nm. A scanning electron micrograph of the electro-spun fibres is shown in FIG. 4.

TABLE 1

| Sample | Porosity (%) | Pore Size (µm) | Thickness (µm) | Air Crossover (cm³/min) | Water Vapour Flux (kg/m²/day) |
|---|---|---|---|---|---|
| Celgard 2500 | 55 | 0.13 | 25 | 5500 | 51.2 |
| ENTEK Si-PE | 63 | 0.07 | 191 | 700 | 25.1 |
| #1A | 97 | ~5 | 44 | >25000 | 104.9 |
| #1B | 96 | ~5 | 85 | >25000 | 80.3 |
| #1C | 94 | ~5 | 136 | >25000 | 68.5 |

Results of air crossover and water vapour flux testing are summarized in TABLE 1. It is evident that the resulting samples of supported nanofibrous layers have very high porosity, large pore size, low resistance to water transport, and high water vapour flux. The supported nanofibrous layers have much greater water vapour flux than microporous materials that are currently used as membrane substrates. The uncoated, supported nanofibrous layers are not selective however.

Example 2

Coating of Supported PAN Nanofibrous Layers with PEO-PU

In order to make the supported nanofibrous materials selective, a dense polymer coating layer can be applied to the nanofibrous layer. Polyether-polyurethanes are known to be effective dense polymer layers, imparting high selectivity for water vapour over other gases, and offering high water vapour permeability. Polyacrylonitrile nanofibrous layers were electro-spun on to a polyester non-woven support layer in a method similar to that described in Example 1. The polyester non-woven (30 cm×80 cm) support was attached to a grounded collector target which was a rotating belt. The belt was rotated at a speed of 1.5 m/min. Nanofibrous mats were deposited on the non-woven supports at 3 levels of nanofibre loading—test results for the three samples are shown in TABLE 2. The porosity of all three samples is quite high—greater than 90% in the test performed.

TABLE 2

| Sample | Spinning Time (mins) | Thickness (µm) | Porosity (%) |
|---|---|---|---|
| #2A | 60 | 8 | >90 |
| #2B | 90 | 12 | >90 |
| #2C | 120 | 15 | >90 |

Polyethyleneoxide-polyurethane (PEO-PU) solutions (PERMAX 230) were formulated with a poly-carbodiimide cross-linker (Picassian XL-702) in a weight ratio of 10:1, with three polymer concentrations of 21%, 15%, and 11% in water. Each of the three functional polymer solutions was coated onto samples of each of the three supported nanofibrous layers (#2A, #2B and #2C). Polymer solution was placed on the sample and a coating rod (#2 bar) was used to cast a layer of coating on the nanofibrous surface. The coating tended to wet the nanofibrous layer and the polyester support layer, and the nanofibrous layer was filled with the coating solution. Excess coating was removed with an tissue, and the samples were dried in an oven at 50° C. to remove the aqueous solvent. Coating loading, oxygen crossover rates, and water vapour flux was determined for each sample as shown in TABLE 3.

TABLE 3

| Sample | Substrate | Coating Polymer wt. % | Coated Weight (g/m²) | Oxygen Crossover (%) | Water Vapour Flux (kg/m²/day) |
|---|---|---|---|---|---|
| #2A-1 | #2A | 21 | 9.0 | 0.0 | 20.9 |
| #2A-2 | #2A | 15 | 4.2 | 1.0 | 35.1 |
| #2A-3 | #2A | 11 | 2.1 | 35 | 44.9 |
| #2B-1 | #2B | 21 | 13.1 | 0.5 | 20.9 |
| #2B-2 | #2B | 15 | 6.3 | 0.0 | 23.4 |
| #2B-3 | #2B | 11 | 2.2 | 4.6 | 34.5 |
| #2C-1 | #2C | 21 | 13.8 | 0.0 | 21.1 |
| #2C-2 | #2C | 15 | 7.5 | 0.0 | 25.8 |
| #2C-3 | #2C | 11 | 4.8 | 0.0 | 28.2 |
| Coated microporous substrate (Mx4-A) | | 15 | 3.0 | 1.0 | 25.0 |

Figure 5:
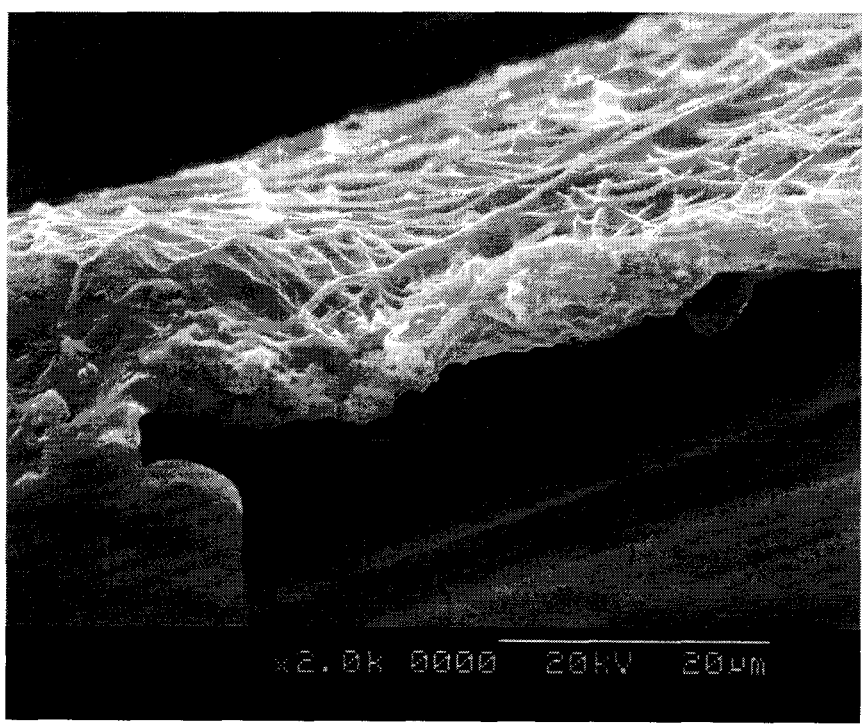
FIG. 5 is an electron micrograph of a cross-section of a coated nanofibrous membrane.

It was found that samples coated with lower concentrations of PEO-PU polymer solution generally had high oxygen crossover (poor selectivity), but also high water vapour flux. A scanning electron microscope image of a cross-section of membrane sample #2C-2 is shown in FIG. 5.

Figure 6:
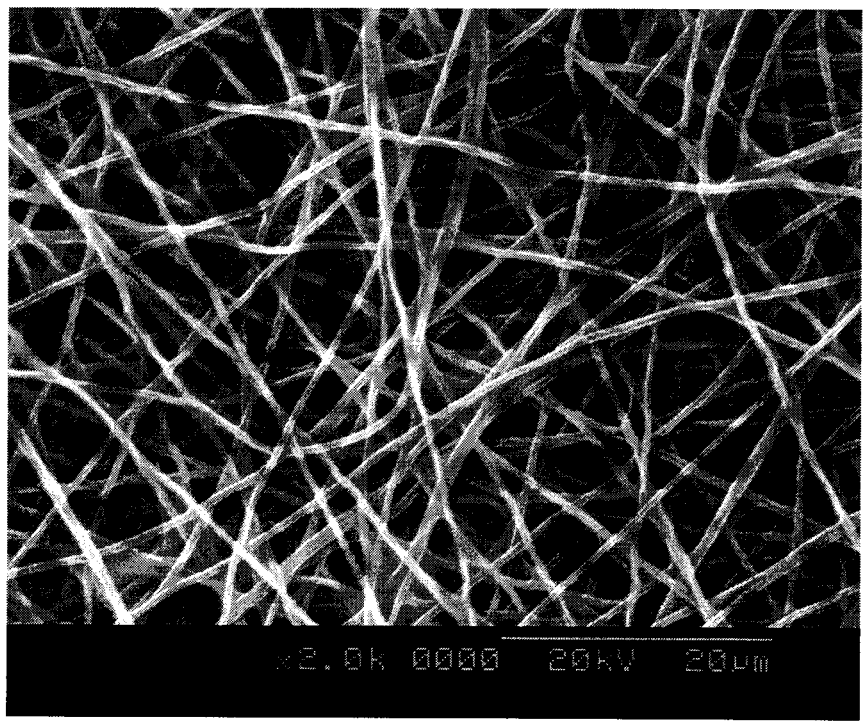
FIG. 6 is an electron micrograph of the surface of a coated polyacrylonitrile nanofibrous layer which has been partially filled with cross-linked polyether-polyurethane polymer.
Figure 7:
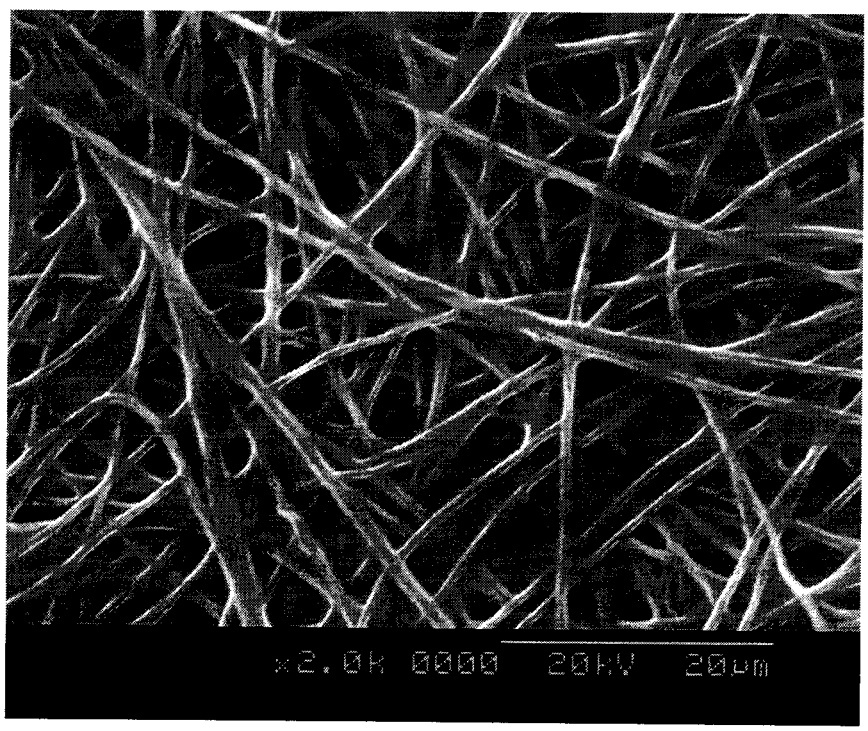
FIG. 7 is an electron micrograph of the surface of a coated polyacrylonitrile nanofibrous layer which is substantially filled with cross-linked polyether-polyurethane polymer.

Scanning electron microscope images are shown for sample #2A-3 and sample #2A-2 in FIG. 6 and FIG. 7 respectively. It can be observed that with the lower concentration of solution (11%) the polymer only partially fills the pores in the nanofibrous layer (FIG. 6), whereas with a higher concentration solution (15%) the polymer appears to completely fill the nanofibrous layer (FIG. 7). Evidently there will be an optimal combination of nanofibrous layer deposition, and coating solution concentration to maximize water vapour flux, while maintaining an acceptable selectivity (e.g. oxygen crossover<1%). Experimental results for a coated microporous membrane (DPoint Mx4) are included in TABLE 3. This membrane is a microporous silica-polyethylene composite material coated with a 3 micron layer of cross-linked polyether-polyurethane (similar to materials described in WO2010/132983). The water vapour transport performance of nanofibrous membrane sample (#2A-2) is better and the oxygen crossover is similar. Since microporous substrates are generally high cost, there is significant potential for lower cost materials based on the nanofibrous membranes described herein.

Example 3

Coating of Supported PAN Nanofibrous Layer with PFSA

Membranes comprising coated supported nanofibrous layers as fabricated in Example 3 demonstrated improved water vapour permeation performance over conventional membranes comprising coated microporous substrates, while maintaining sufficient selectivity. However, the water vapour permeance was considerably lower than that of the uncoated, supported nanofibrous layers described in Example 1. Decreasing the loading of the functional coating or increasing the water vapour permeability of the functional coating is thus desirable.

One method by which to increase the permeance of the final membrane would be to use a functional polymer with a higher water vapour permeability than the polyether-polyurethane polymers used in Example 3. There are many polymers with higher permeability than polyether-polyurethanes, as discussed above. Sulphonated polymers are one such class of polymers—many of these have high water vapour permeability and high selectivity for water vapour, for example, perfluorosulfonic acid-polytetrafluoroethylene copolymers (PFSA), available under the tradename Nafion®.

A Nafion® dispersion (DE2021) was obtained from DuPont containing 20% PFSA polymer in alcohols. The solution was cast onto a supported nanofibrous layer using the method described in Example 3. The nanofibrous layer was filled with the PFSA coating solution, and the sample was placed in an oven at 70° C. to evaporate the solvent and anneal the polymer coating. The functional coating was only partially effective at bonding the nanofibrous layer to the polyester support layer. However the nanofibrous layer was filled with PFSA and was mechanically sound and dimensionally stable in water. The coating loading was 25 g/m$^2$, the oxygen crossover was 0%, and the water flux was 42 kg/m$^2$/day. Even though the coating loading was quite high, using a polymer with higher permeability improves the water permeation performance greatly. The nanofibrous membrane of this example has 1.5× the water flux of the DPoint Mx4 material referred to in Example 2. However the cost of the PFSA polymer is significantly greater than the PEO-PU polymer used in Example 3, so there may be a tradeoff between cost and performance.

Example 4

Coated Nanofibrous Layer on a Metal Mesh Support

Figure 8A:
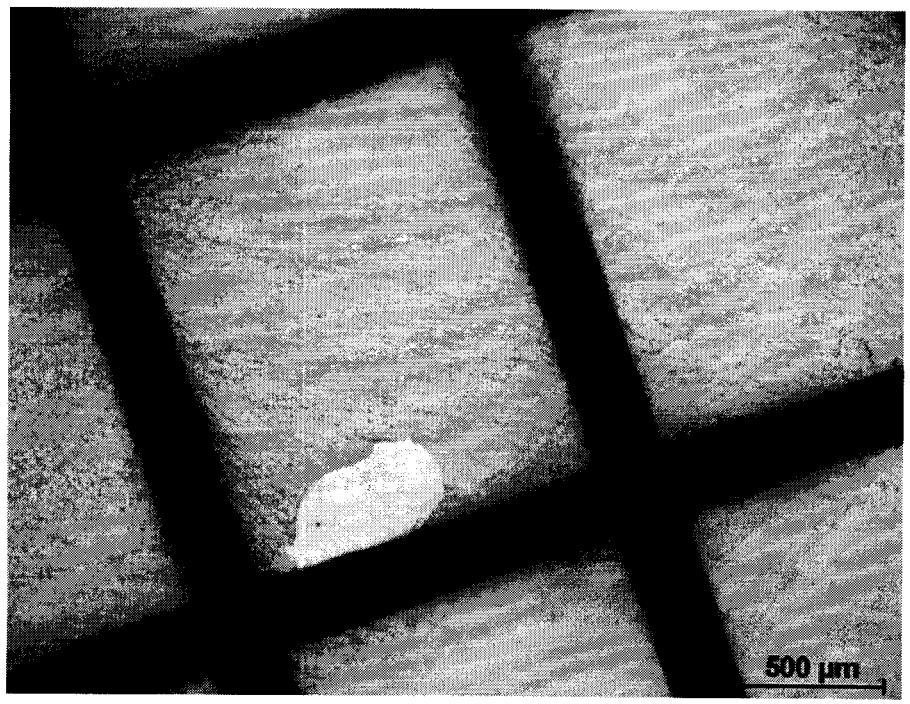
FIG. 8A is an optical micrograph of a polyether-polyurethane coated polyacrylonitrile nanofibrous layer on an aluminum mesh support layer.
Figure 8B:
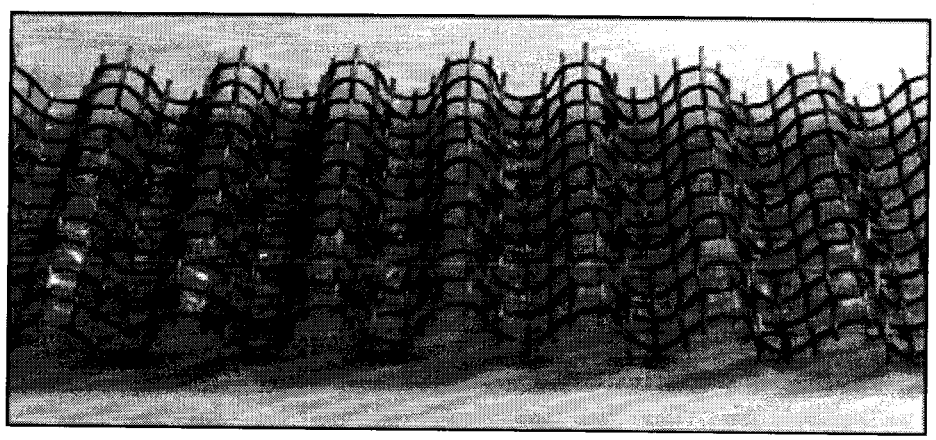
FIG. 8B is a photo of a corrugated sample of the membrane of FIG. 8A.

A sheet of aluminum 18×16 mesh, wire diameter 0.011" was obtained from Phifer. A 30×70 cm mesh was placed on the collector belt of an electro-spinning apparatus, and a coating of nanofibrous PAN was deposited on the surface of the mesh from a distance of 15 cm. The spinning voltage was 17.5 kV, the collector belt was rotated at a rate of 1.5 m/min, the 18G, 1.5" syringe traversing over a 15 cm distance at a rate of 1.5 cm/min. The deposition time was 30 minutes. A 16.5% polyether-polyurethane aqueous solution was mixed with a cross-linker (1.3%) and applied to the nanofibre-coated aluminum mesh. The polymer solution wetted the mesh and the nanofibrous layer. Excess coating was removed from the mesh with a tissue, and the sample was dried in an oven at 50° C. A micrograph of the resulting membrane is shown in FIG. 8A. There is a small defect where no coating was applied, that gives contrast to show the coating. The membrane had an oxygen crossover of zero, and a water vapour flux of 27 kg/m$^2$/day. The performance is similar to prior art microporous membranes, but the material can be easily bent and formed, without damaging the coated nanofibrous layer. The added strength of the fibre-reinforced functional coating assists in forming this material without damaging the functional coating. A corrugated sample of the membrane is shown in FIG. 8B.

Example 5

Formable Membranes Based on Meshes

A series of membranes were fabricated similar to Example 4, with five deposition times (30, 45, 60, 75, and 90 minutes of electro-spinning time). The mesh utilized was a polymer coated mesh (PERMA-KOTE electrostatic powder-coated aluminum mesh) from Phifer with a 7×8 mesh and 0.011" wire diameter. The samples of supported nanofibre layer was then impregnated with an aqueous solution of polyether-polyurethane coating solution with cross-linker at three different concentrations (11%, 14.5%, and 18% by weight). The samples were dried at 50° C. in an oven. The final membrane samples were weighed to determine the coating weight and then tested for oxygen crossover and water vapour transport. The results are summarized in TABLE 4. Some of these results are anomalous due to imperfections in the coating process. The mesh tended to become coated during the process, and coat weights in the nanofibrous layer were difficult to determine with certainty. Further, defects in the coating process affected the transport experiments on the membranes. Generally, increasing the nanofibre deposition and increasing the functional polymer solution concentration led to an increase in final coating weight. Increased coating weight corresponded to decreased oxygen crossover (desirable, i.e. less defects), but also decreased water transport (undesirable, lower effectiveness). Some of the membranes produced had performances comparable or better than known or conventional membrane materials.

The membranes were then formed in a compression mold to fabricate ERV plates. However, the molding process tended to fracture the wires in the mesh support, and it was determined that alternative formable support layers would be more appropriate.

TABLE 4

| Sample | Estimated Nanofibre Deposition (g/m$^2$) | Coating Polymer wt. % | Coated Weight (g/m$^2$) | Oxygen Crossover (%) | Water Vapour Flux (kg/m$^2$/day) |
| --- | --- | --- | --- | --- | --- |
| #0077 | 0.35 | 11.0 | 3.3 | 24 | 45.2 |
| #0078 | 0.52 | 11.0 | 5.2 | 1.4 | 31.7 |

TABLE 4-continued

| Sample | Estimated Nanofibre Deposition (g/m$^2$) | Coating Polymer wt. % | Coated Weight (g/m$^2$) | Oxygen Crossover (%) | Water Vapour Flux (kg/m$^2$/day) |
|---|---|---|---|---|---|
| #0079 | 0.70 | 11.0 | 4.9 | 5.8 | 37.5 |
| #0080 | 0.87 | 11.0 | 8.6 | 0.5 | 27.4 |
| #0081 | 1.04 | 11.0 | 4.2 | 0.0 | 23.2 |
| #0082 | 0.35 | 14.5 | 1.0 | 0.5 | 21.5 |
| #0083 | 0.52 | 14.5 | 2.6 | 0.5 | 26.7 |
| #0084 | 0.70 | 14.5 | 9.9 | 46.2 | 34.0 |
| #0085 | 0.87 | 14.5 | 6.4 | 47.1 | 29.0 |
| #0086 | 1.04 | 14.5 | 8.0 | 0.0 | 20.0 |
| #0087 | 0.35 | 18.0 | 0.8 | 0.5 | 26.7 |
| #0088 | 0.52 | 18.0 | 7.1 | 0.5 | 23.5 |
| #0089 | 0.70 | 18.0 | 14.0 | 13.5 | 36.2 |
| #0090 | 0.87 | 18.0 | 2.2 | 1.0 | 19.6 |
| #0091 | 1.04 | 18.0 | 10.2 | 0.0 | 18.2 |

Example 6

Formable Membranes Based on Non-Wovens

Sheets of polyester spunbond nonwoven fabric (Smash Specialty Nonwoven Y15100) were obtained from Asahi Kasei. These materials are designed for formability under low heat (<100° C.). Coatings of PAN nanofibres were deposited on these support layers with three different loadings. The nanofibrous layers were then impregnated with aqueous solutions of a polyether-polyurethane co-polymer at three concentrations (13, 15, and 17% by weight). The materials were dried in an oven at 50° C. The membranes were tested for oxygen crossover and water vapour transport, and the results are summarized in TABLE 5. Materials with low oxygen crossover tended to have lower water vapour transport rates.

Figure 9:
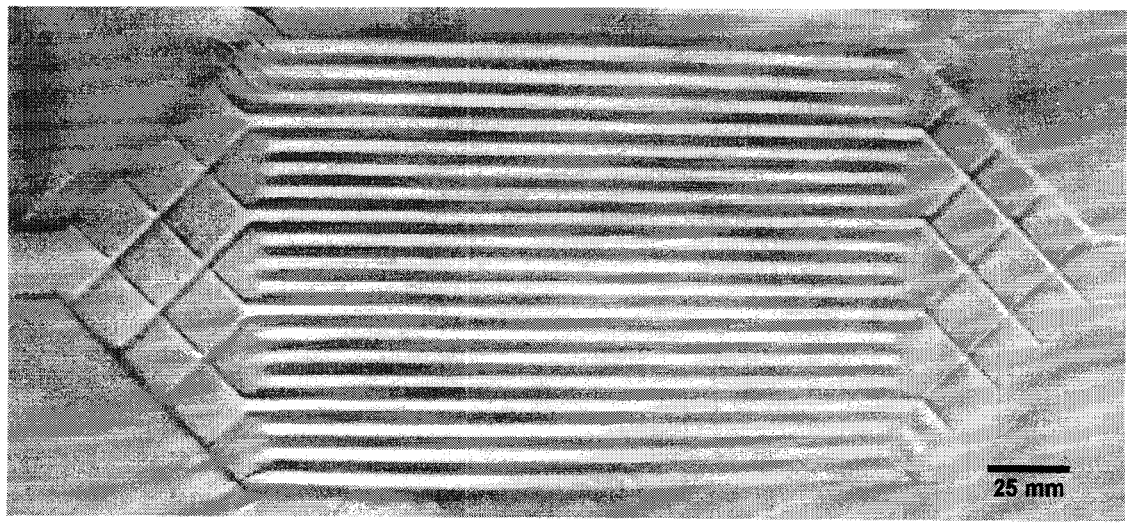
FIG. 9 is a photo of a formed (compression molded) enthalpy exchanger plate made from a selective water vapour permeable membrane comprising a coated nanofibrous layer on a polyester spunbond nonwoven fabric support layer.

The materials were then formed in a heated (80° C.) compression mold for an enthalpy exchanger plate. A formed enthalpy exchanger plate made from one of the nanofibrous membrane samples can be seen in FIG. 9.

Strips of formed materials were then measured for elongation and tested again for water vapour transport and oxygen transport, and the results are shown in TABLE 6. It was determined that the forming step elongated the membranes which led to an increase in water vapour transport, without significantly increasing oxygen transport. The forming step elongates the selective, water vapour permeable coating making it thinner, which leads to higher flux in the membrane. The membranes formed elongated in one direction (perpendicular to the flow channels) by an average of 8.3% and had a water vapour transport increase of 21%.

This procedure created membranes with high water vapour transport (>25 kg/m$^2$/day) and low oxygen crossover (<1%), which can be formed into enthalpy exchanger plates.

TABLE 5

| Sample | Estimated Nanofibre Deposition (g/m$^2$) | Coating Polymer wt. % | Coated Weight (g/m$^2$) | Oxygen Crossover (%) | Water Vapour Flux (kg/m$^2$/day) |
|---|---|---|---|---|---|
| #0108 | 0.92 | 13% | 9.9 | 0 | 21.2 |
| #0109 | 0.92 | 15% | 13.8 | 0.5 | 21.0 |
| #0110 | 0.92 | 17% | 20.4 | 0.5 | 17.2 |
| #0111 | 0.53 | 13% | 8.5 | 0.5 | 21.7 |
| #0112 | 0.53 | 15% | 13.8 | 0.5 | 22.6 |
| #0113 | 0.53 | 17% | 20.3 | 1.0 | 19.0 |
| #0114 | 0.36 | 13% | 6.8 | 9.6 | 32.7 |
| #0115 | 0.36 | 15% | 18.0 | 13.5 | 30.6 |
| #0116 | 0.36 | 17% | 17.9 | 13.0 | 24.3 |

TABLE 6

| Sample | Oxygen Crossover Post-forming (%) | Water Vapour Flux Post-forming (kg/m$^2$/day) | Elongation (%) | Increase in Oxygen Crossover | % Increase in Water Vapour Transport |
|---|---|---|---|---|---|
| #0108 | 0.0 | 23.9 | 6.1 | None | 13 |
| #0109 | 0.5 | 25.7 | 9.4 | None | 23 |
| #0110 | 0.0 | 20.4 | 6.7 | None | 19 |
| #0111 | 0.0 | 24.7 | 10.0 | None | 14 |
| #0112 | 1.0 | 26.5 | 8.3 | Minor | 17 |
| #0113 | 1.9 | 26.6 | 11.7 | Minor | 40 |
| #0114 | 9.1 | 39.5 | 7.8 | None | 21 |
| #0115 | 12.0 | 36.8 | 8.9 | None | 20 |
| #0116 | 14.9 | 30.1 | 6.1 | Minor | 24 |
| Average | | | 8.3% | | 21% |

Example 7

Gravure Coating Trials

The coating/impregnation procedure utilized in the previous Examples presented a challenge as it was difficult to control the amount of coating solution applied to the nanofibrous layer. in Example 5 the nanofibrous layers are made from a moderately wettable polymer (PAN) and the support layer is made from a highly wettable PET polymer. The nanofibrous layer is highly sorbtive to aqueous coatings due to capillary action and so both layers tended to be wetted by the aqueous coating. As previously mentioned, this is beneficial in that the layer becomes bonded together in the coating/drying procedure making a composite, structurally robust material. However, there is difficulty metering the coating solution through this method.

In an attempt to improve the coating procedure, a nanofibrous PAN layer was electro-spun onto a PET nonwoven layer, and this material was then impregnated using a gravure coating head. The gravure roller is an etch roller with a defined surface pattern. The roller used for these trials was 180Q (180 quadrilateral shaped cells per square inch). In the coating trials the gravure roller is passed through a bath containing the functional coating solution, and the solution is picked up by capillary action into the cells of the gravure. The coating solution used was an aqueous polyether-polyurethane copolymer solution with a polycarbodiimide cross-linker at 26.5% solids. A doctor blade removed excess coating from the roller, such that coating solution only remained in the cells of the gravure. The supported nanofibrous layer was interfaced with the roller in such a manner that the nanofibrous layer contacted the gravure roller. The nanofibrous layer absorbed the coating from the cells of the gravure and was dried. This method allows for a controlled amount of coating solution to be applied to the nanofibrous layer, which is beneficial over other coating methods tested. Those skilled in the art will recognize that gravures with other patterns and cell volumes, as well as use of coating solutions with different concentrations, will allow varying degrees of deposition/impregnation of the functional polymer on or into the nanofibrous layer, and different overall loadings to be achieved.

The membranes produced by this method had functional coating loadings in the range of 3 to 4 g/m². The oxygen transport rate was 2.9% and the water vapour transport rate was 30.0 kg/m²/day.

Summary of Test Methods Used in the Examples

A dynamic water vapour transport testing procedure was developed which was designed to test the membranes under conditions which are similar to those in which they might be utilized. A sample of membrane material was sealed in a test apparatus with flow field pathways on both sides of the membrane to evenly distribute gases over the both surfaces of the material, the gases being separated by the membrane. The flow rate, temperature, and relative humidity of each inlet gas stream could be controlled, and the outlet temperatures and relative humidity of each gas stream could be measured. The gases were supplied and directed in counterflow over the opposing surfaces of the membrane. The membrane active area in the test jig was 33 cm². The entire apparatus is located within a temperature controlled oven, such that all measurements are isothermal and that no condensation may occur within the membrane module or on the humidity probes. In a typical test, a first gas stream was supplied at 50° C. and 0% relative humidity to the inlet on one side on the membrane. A second gas stream was supplied to the inlet on the other side of the membrane at 50° C. and 50% relative humidity, and at the same flow rate as the first gas. The oven was maintained at 50° C. in order to maintain isothermal experiments. The water content and temperature of the two streams were measured and recorded at the outlets. From these values, the water transport rate of the test sample was determined, in units of mass per time (g/h). The results may also be reported as a water flux by dividing by the membrane area over which the transport has occurred in units of mass per area per time (g/m²/h). By dividing the water flux by the calculated mean water vapour pressure differential within the test module, a water permeance value can be determined in units of moles per area per time per vapour pressure differential (mol/m²/s/Pa). Due to the scale of the results it was found to be most convenient to report water transport data as a water flux value in units of kg/m²/day.

To assess the air permeation or air crossover properties of the membrane materials in the above Examples, samples of the membrane material were sealed in a test apparatus. Pressurized air was applied to one side of the membrane and the air flow through the material was recorded. In a typical test, the pressurized air was applied at various pressures. The crossover flow rate through the test sample was recorded in cubic centimeters per minute (cm³/min). This value can be converted to an air permeance value by dividing by the applied pressure and the membrane area (33 cm² in a typical test). Air permeance can be reported in mol/m²/s/Pa.

The porosity was measured by cutting a sample of the material of known area, soaking the sample in a wetting fluid of known density, removing excess moisture with a absorptive tissue, and weighing the wet sample. The sample was then dried in an oven, and the dry weight was determined. The thickness of the sample was measured using a micrometer. The porosity was calculated as the difference between the wet and dry weight over the density of the wetting fluid, divided by the sample volume.

The oxygen crossover provides an indication of the selectivity of the membrane material. A test was developed to determine the oxygen crossover of the membrane. In this test, again a membrane sample was placed in a test apparatus which separates the two sides of the membrane, so that independent gas streams may be provided on opposing sides of the membrane. On one side of the membrane a pure nitrogen stream was passed over the surface of the membrane. On the other side of the membrane an air stream was passed over the membrane surface. The differential pressure between the two streams was maintained at zero so that only diffusive transport and not convective transport occurs through the membrane. An oxygen sensor was placed at the outlet of the nitrogen stream to measure the oxygen concentration. Since the concentration of oxygen in air is known, and the nitrogen stream contained no oxygen at the inlet, the percentage of oxygen passing through the membrane by diffusion can be reported as:

$$\text{Oxygen Crossover \%} = \{[C(O_2,1)]/[C(O_2,2)]\} \times 100$$

where C refers to the percent concentration of oxygen ($O_2$) at points 1 and 2, with point 1 being at the nitrogen-side outlet (measured by the sensor), and point 2 being at the air-side inlet (known, 20.95%). This test is completed at various flow rates, the oxygen permeance rate can also be calculated from these results.

In order to accurately and consistently coat membranes on a bench-scale, a Mayer rod coater was used. This type of coating device may also be referred to as Meyer bar, miter rod, Meyer rod, meter bar, coating rod, equalizer bar, doctor rod, or metering rod coater. In these types of bars, steel wire is wound tightly around a rod. The gap spacing created between adjacent wraps of the wire will depend on the diameter of the wire used to wrap the rod. In the coating apparatus used in the above examples, the wire-wound rod is placed at a substantially constant downward pressure on top of the nanofibrous layer, and then functional polymer solution is deposited by pipette onto the surface in front of the rod. A linear actuator drives the rod across the surface at a constant rate spreading the functional coating on the nanofibrous layer. The thickness of the wet coating deposited on the nanofibrous layer will depend on the diameter of the wire used to wrap the rod. Wire diameters used ranged from 0.05 to 0.3 mm allowing controlled wet film deposits ranging from about 4 micron to about 24 micron. The coating settles by gravity into a film of substantially uniform wet thickness, after which the material is dried and cured to remove the solvent and create a coated nanofibrous layer with a consistent dry coating thickness and coating loading. Further refinement in the coating loading can be achieved by altering the solids content or concentration, viscosity, density, and surface tension properties of the solution used.

The present membranes are particularly suitable for use in enthalpy exchangers, but may also be suitable for other applications involving exchange of moisture and optionally heat between gas streams with little or no mixing of the gas streams through the membrane. Such potential applications include fuel cell humidifiers, gas drying, dehumidification, medical gas humidification, airplane humidification, and flue gas heat and water recovery.

Figure 10:
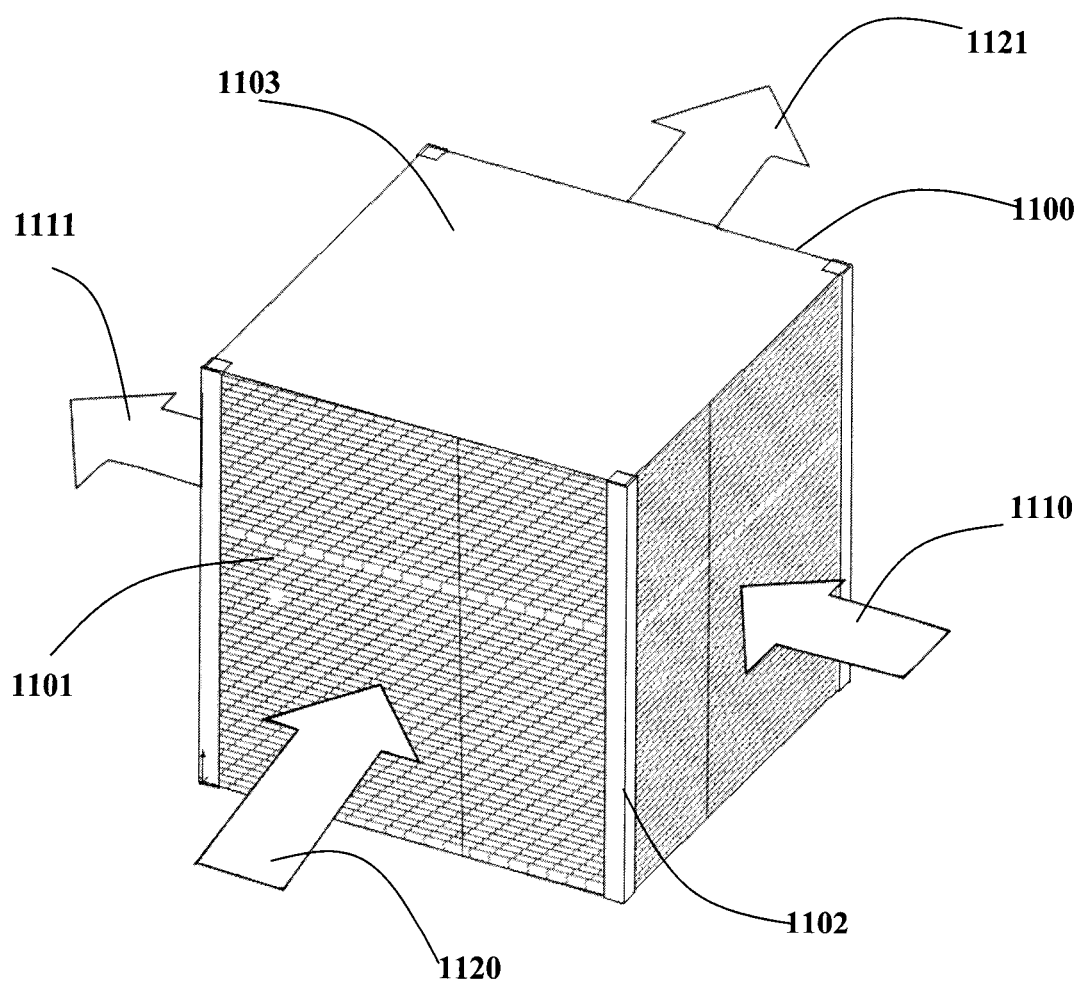
FIG. 10 is a simplified isometric view of a cross-flow ERV core.

FIG. 10 is a simplified isometric view of embodiment of an ERV core 1100 comprising alternating layers of pleated membrane 1101 with gas flow pathways in between adjacent layers. The flow pathways can comprise channels that run through the core over the surface of the membrane and are sealed such that there is flow of two gas streams through the core without mixing of the two streams through the membrane. The gas streams are directed through ERV core 1100 such that one side of each membrane layer is exposed to one gas stream 1110 and the opposing side of the membrane layer is exposed to the other gas stream 1120. In the illustrated embodiment the gases are in a cross-flow configuration. Counterflow, co-flow, and other relative flow configurations can be used depending on the geometry of the ERV core and the manifolding. Transport of heat and moisture occurs through the membrane due to the differential of heat of moisture between the two gas streams. The flow of heat and moisture may occur in either direction through the membrane, depending on the conditions of the gas streams 1120 and 1110. When stream 1110 is cool and dry and stream 1120 is warm and moist, heat and humidity transport will occur through the membrane to heat and humidify flow 1110 before it exits the core at 1121. The warm and moist flow 1120 will thus be cooled and dehumidified as it passes through the core and exits at 1121.

The perimeter of the pleated membrane cartridge is sealed to prevent gases from leaking between the perimeter of the pleated cartridge and the interior of the ERV housing (not shown in FIG. 10). For example, gaskets or seals 1102 and 1103 can be disposed along the edges of the pleated membrane cartridge and on the top and bottom surfaces so that, once in the ERV system, a seal will be created between the inlet and outlet ports to prevent short-circuiting of the gases between the streams.

Figure 11:
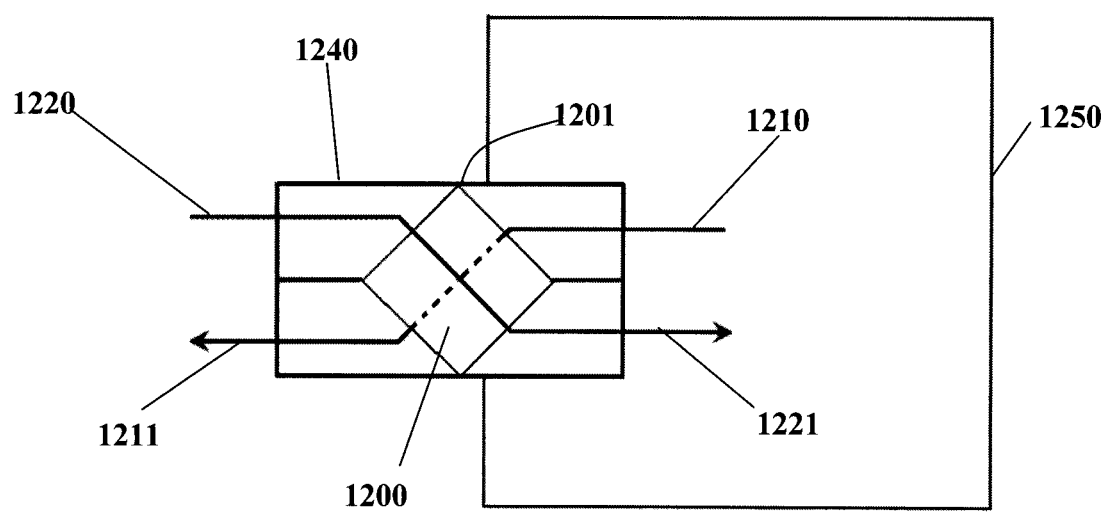
FIG. 11 is a simplified diagram illustrating use of an ERV system.

FIG. 11 is a simplified view of an ERV core 1200 in an ERV system 1240. System 1240 can contain fans and controls to move the air through the system in the directions indicated by the arrows in FIG. 11. Seals are disposed around the periphery of the core. The ERV system interfaces between air in an enclosed building space 1250, and the exterior environment. The seals allow air streams to be directed through ERV core 1200 in such a way that incoming air 1220 entering building 1250 passes on one side of the membrane layers in the core 1200 and outgoing air 1210 exiting the building passes on the other side of the membrane layers in the core. If the outgoing air 1211 is cool and dry and the incoming air 1220 is warm and moist, heat and moisture transport will occur through the membrane in the core such that the exhaust air at 1210 will have gained heat and moisture, and air entering the enclosure at 1221 will have been cooled and dehumidified.

While particular embodiments and applications of the present invention have been shown and described, it will be understood, of course, that the invention is not limited thereto since modifications can be made by those skilled in the art without departing from the scope of the present disclosure, particularly in light of the foregoing teachings.

What is claimed is:

1. A composite membrane comprising:
   a macroporous support layer;
   a framework layer comprising nanofibres, the framework layer supported on one surface of the macroporous support layer; and
   a water-vapour-permeable, substantially air-impermeable coating supported by the framework layer;
   wherein the composite membrane is formable to provide a self-supporting three-dimensional structure that is water-vapour-permeable and substantially air-impermeable.

2. The composite membrane of claim 1 wherein the composite membrane has water vapour transport of at least 15 kg/m²/day and oxygen crossover less than 1%.

3. The composite membrane of claim 1 wherein the support layer comprises a material that is formable by thermal molding at temperatures of 100 C or less.

4. The composite membrane of claim 1 wherein the composite membrane is formable by compression molding and the water-vapour-permeable, substantially air-impermeable coating is stretchable to accommodate dimensional changes caused by the forming without compromising the substantial air-impermeability of the coating.

5. The composite membrane of claim 1 wherein the composite membrane is stretchable by an amount in the range of 6.1 to 11.7 percent.

6. The composite membrane of claim 1 formed to have a self-supporting three-dimensional structure comprising a plurality of flow channels.

7. The composite membrane of claim 1 wherein the water-vapour-permeable coating is at least one of flexible and elastomeric.

8. The composite membrane of claim 1 wherein the water-vapour-permeable coating comprises a thermoplastic elastomer.

9. The composite membrane of claim 1 wherein the water vapor permeable coating comprises an amorphous polymer.

10. The composite membrane of claim 1 wherein the water vapor permeable coating comprises a copolymer.

11. The composite membrane of claim 10 wherein the copolymer comprises a cross-linked polyurethane-polyether copolymer.

12. The composite membrane of claim 1 wherein the water vapor permeable coating comprises a sulfonated polymer.

13. The composite membrane of claim 1 wherein the water vapor permeable coating comprises a polymer blend.

14. The composite membrane of claim 1 wherein the framework layer is substantially filled with the water-vapour-permeable coating.

15. The composite membrane of claim 1 wherein the water-vapour-permeable coating contacts the macroporous support layer.

16. The composite membrane of claim 1 wherein the framework layer is partially filled with the water-vapour-permeable coating.

17. The composite membrane of claim 1 wherein a loading of the water-vapour-permeable coating on the composite membrane is in the range of 0.5-10 g/m².

18. The composite membrane of claim 1 wherein the macroporous support layer is thermoplastic.

19. The composite membrane of claim 1 wherein the macroporous support layer comprises a polymeric non-woven material.

20. The composite membrane of claim 1 wherein the macroporous support layer comprises a polyester spunbond non-woven fabric.

21. The composite membrane of claim 1 wherein the macroporous support layer comprises a polymer mesh or a metal mesh.

22. The composite membrane of claim 1 wherein a thickness of the composite membrane is less than 200 microns.

23. The composite membrane of claim 1 wherein a thickness of the composite membrane is less than 100 microns.

24. The composite membrane of claim 1 wherein a thickness of the framework layer with the water-vapour-permeable, substantially air-impermeable coating is less than 15 microns.

25. An enthalpy exchanger plate that is water-vapour-permeable and substantially air-impermeable, the enthalpy exchanger plate consisting essentially of a molded composite membrane according to claim 1.

26. The enthalpy exchanger plate of claim 25 wherein the enthalpy exchanger plate comprises a flow field region having a plurality of channels molded therein and a manifold region having support ribs molded therein.

27. The enthalpy exchanger plate of claim 25 where the composite membrane is molded by compression molding.

28. The enthalpy exchanger plate of claim 25 where the composite membrane is thermally molded.

29. The enthalpy exchanger plate of claim 25 where the composite membrane is molded at a temperature of less than 100 C.

30. An enthalpy exchanger core comprising a plurality of the enthalpy exchanger plates according to claim 25.

* * * * *